(12) United States Patent
Dunn et al.

(10) Patent No.: US 11,824,495 B2
(45) Date of Patent: Nov. 21, 2023

(54) ELECTRONIC DISPLAY ASSEMBLIES WITH SOLAR PANELS

(71) Applicant: Manufacturing Resources International, Inc., Alpharetta, GA (US)

(72) Inventors: William Dunn, Alpharetta, GA (US); Gerald Fraschilla, Snellville, GA (US); Jack Bartholmae, Duluth, GA (US); Douglas Bennett, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

(21) Appl. No.: 17/959,414

(22) Filed: Oct. 4, 2022

(65) Prior Publication Data
US 2023/0030376 A1 Feb. 2, 2023

Related U.S. Application Data

(63) Continuation of application No. 17/339,837, filed on Jun. 4, 2021, now Pat. No. 11,496,091, which is a
(Continued)

(51) Int. Cl.
*H02S 40/38* (2014.01)
*G09F 23/00* (2006.01)
(Continued)

(52) U.S. Cl.
CPC ............ *H02S 40/38* (2014.12); *B60L 53/305* (2019.02); *B60L 53/51* (2019.02); *G09F 9/35* (2013.01);
(Continued)

(58) Field of Classification Search
CPC .......... H02S 40/38; H02S 20/10; H02S 30/10; B60L 53/51; B60L 53/305; B60L 53/30; G09F 9/35; G09F 23/0083; G09F 23/00
See application file for complete search history.

(56) References Cited

U.S. PATENT DOCUMENTS

| | | |
|---|---|---|
| 3,141,588 A | 7/1964 | McMiller |
| 3,525,461 A | 8/1970 | Bronson |

(Continued)

FOREIGN PATENT DOCUMENTS

| | | |
|---|---|---|
| AU | 201815719 | 10/2018 |
| AU | 201815720 | 10/2018 |

(Continued)

OTHER PUBLICATIONS

CIVIQ Smartscapes, There are companies that make kiosks. And then there's CIVIQ.—Advanced Smart City Platform, webpage, Jan. 30, 2019, 10 pages.

(Continued)

*Primary Examiner* — Robert L Deberadinis
(74) *Attorney, Agent, or Firm* — STANDLEY LAW GROUP LLP; Jeffrey S. Standley; Adam J. Smith

(57) ABSTRACT

A display assembly includes electronic displays secured to a structural framework at an elevated position, the structural framework including one or more members and configured for attachment to a surface. Solar panels are secured to the structure framework at a location above the electronic displays, and bulk energy storage devices are secured to the structure framework and electrically connected with the electronic displays and the solar panels.

17 Claims, 29 Drawing Sheets

Related U.S. Application Data continuation-in-part of application No. 17/001,916, filed on Aug. 25, 2020, now Pat. No. 11,148,621.

(60) Provisional application No. 62/911,806, filed on Oct. 7, 2019, provisional application No. 62/892,104, filed on Aug. 27, 2019.

(51) Int. Cl.

| | | |
|---|---|---|
| *B60L 53/30* | (2019.01) | |
| *H02S 20/10* | (2014.01) | |
| *H02S 30/10* | (2014.01) | |
| *B60L 53/51* | (2019.01) | |
| *G09F 9/35* | (2006.01) | |

(52) U.S. Cl.
CPC .......... *G09F 23/0083* (2013.01); *H02S 20/10* (2014.12); *H02S 30/10* (2014.12)

(56) References Cited

U.S. PATENT DOCUMENTS

| | | |
|---|---|---|
| D222,989 S | 2/1972 | Cohen |
| 3,978,599 A | 9/1976 | Berger |
| 4,052,806 A | 10/1977 | George |
| 4,114,789 A | 9/1978 | Blaylock et al. |
| 4,261,496 A | 4/1981 | Mareydt et al. |
| 4,449,656 A | 5/1984 | Wouden |
| 4,500,020 A | 2/1985 | Rasor |
| 4,534,496 A | 8/1985 | Bott |
| 4,640,450 A | 2/1987 | Gallion et al. |
| 4,667,428 A | 5/1987 | Elmer |
| 4,671,004 A | 6/1987 | Berg |
| 4,718,185 A | 1/1988 | Conlin et al. |
| D294,137 S | 2/1988 | Robson |
| D296,087 S | 6/1988 | Luck |
| 4,768,691 A | 9/1988 | Stapleton |
| 4,778,092 A | 10/1988 | Grace |
| D306,990 S | 4/1990 | Bott |
| D311,722 S | 10/1990 | Cheng |
| 4,972,983 A | 11/1990 | Bott |
| 4,982,886 A | 1/1991 | Cucheran |
| D314,983 S | 2/1991 | Cangianni et al. |
| 4,993,615 A | 2/1991 | Arvidsson |
| 5,016,798 A | 5/1991 | Stapleton et al. |
| 5,038,988 A | 8/1991 | Thulin |
| D320,971 S | 10/1991 | Sparham et al. |
| 5,104,020 A | 4/1992 | Arvidsson et al. |
| D326,282 S | 5/1992 | Spoljaric |
| 5,132,666 A | 7/1992 | Fahs |
| 5,170,920 A | 12/1992 | Corrente et al. |
| 5,171,083 A | 12/1992 | Rich |
| 5,207,365 A | 5/1993 | Bott |
| 5,257,710 A | 11/1993 | Cropley |
| 5,306,156 A | 4/1994 | Gibbs et al. |
| 5,347,736 A | 9/1994 | Kanigan |
| 5,385,285 A | 1/1995 | Cucheran et al. |
| D357,944 S | 5/1995 | Atwell et al. |
| 5,474,218 A | 12/1995 | Arsenault, Jr. et al. |
| 5,560,525 A | 10/1996 | Grohmann et al. |
| D380,191 S | 6/1997 | White |
| 5,711,100 A | 1/1998 | Elmer |
| D398,409 S | 9/1998 | Jessa |
| 5,826,766 A | 10/1998 | Aftanas |
| D403,434 S | 12/1998 | Sander |
| 5,845,828 A | 12/1998 | Settelmayer |
| 5,871,190 A | 2/1999 | Henriksson |
| D408,554 S | 4/1999 | Dinwoodie |
| D410,036 S | 5/1999 | Washington |
| D410,751 S | 6/1999 | Meier |
| 5,918,397 A | 7/1999 | Elmer |
| 5,979,723 A | 11/1999 | Tress et al. |
| 6,050,467 A | 4/2000 | Drouillard et al. |
| D430,901 S | 9/2000 | Palmer |
| 6,114,954 A | 9/2000 | Palett et al. |
| 6,116,486 A | 9/2000 | Indell |
| D453,194 S | 1/2002 | Gentelia et al. |
| D455,789 S | 4/2002 | Schlueter |
| 6,378,747 B1 | 4/2002 | Fisch et al. |
| 6,396,239 B1 | 5/2002 | Benn et al. |
| 6,415,970 B1 | 7/2002 | Kmita et al. |
| D479,859 S | 9/2003 | Strunk et al. |
| D483,074 S | 12/2003 | Strunk et al. |
| 6,660,937 B1 | 12/2003 | MacLeod et al. |
| D486,188 S | 2/2004 | Norcross et al. |
| 6,701,143 B1 | 3/2004 | Dukach et al. |
| D493,842 S | 8/2004 | Norcross et al. |
| 6,812,851 B1 | 11/2004 | Dukach et al. |
| D500,143 S | 12/2004 | Moncho et al. |
| 6,850,209 B2 | 2/2005 | Mankins et al. |
| D505,113 S | 5/2005 | Lam |
| D514,913 S | 2/2006 | Dunn et al. |
| D530,432 S | 10/2006 | Gottesdiener |
| 7,134,764 B1 | 11/2006 | Bieberdorf |
| D535,034 S | 1/2007 | Gottesdiener |
| D560,668 S | 1/2008 | Pritchard et al. |
| 7,434,713 B2 | 10/2008 | Linden |
| 7,449,998 B1 | 11/2008 | Au et al. |
| D585,943 S | 2/2009 | Pymm et al. |
| D593,213 S | 5/2009 | Grimshaw et al. |
| D595,645 S | 7/2009 | Beghelli |
| D603,973 S | 11/2009 | Jackson et al. |
| D610,536 S | 2/2010 | Brumels |
| D634,722 S | 3/2011 | Kim et al. |
| D635,614 S | 4/2011 | Yan |
| D639,340 S | 6/2011 | Martin |
| D639,800 S | 6/2011 | Magruder |
| D646,269 S | 10/2011 | Crick, Jr. et al. |
| D647,970 S | 11/2011 | Strempack |
| D653,662 S | 2/2012 | Park et al. |
| D654,116 S | 2/2012 | McDougall et al. |
| 8,122,628 B2 | 2/2012 | Johnson, Jr. |
| D657,421 S | 4/2012 | Yan |
| D657,422 S | 4/2012 | Yan |
| D659,259 S | 5/2012 | Duddy |
| D662,040 S | 6/2012 | Yang et al. |
| D665,029 S | 8/2012 | Krapf et al. |
| D669,938 S | 10/2012 | Lard et al. |
| D671,885 S | 12/2012 | Steinau |
| 8,534,516 B1 | 9/2013 | Vo |
| D694,170 S | 11/2013 | Eriksson |
| D696,658 S | 12/2013 | Winston et al. |
| D704,265 S | 5/2014 | Yan |
| D710,298 S | 8/2014 | Jie et al. |
| 8,819,968 B1 | 9/2014 | Van Beek |
| 8,895,836 B2 | 11/2014 | Amin et al. |
| 9,121,391 B1 | 9/2015 | Koehler, III |
| 9,135,839 B2 | 9/2015 | Remenda |
| D740,472 S | 10/2015 | Linton et al. |
| D740,966 S | 10/2015 | Indio da Costa et al. |
| D747,816 S | 1/2016 | Indio da Costa et al. |
| D752,529 S | 3/2016 | Loretan et al. |
| D754,256 S | 4/2016 | Maman et al. |
| D763,357 S | 8/2016 | Tsuru et al. |
| D765,660 S | 9/2016 | Kim et al. |
| 9,451,060 B1 | 9/2016 | Bowers et al. |
| 9,516,485 B1 | 12/2016 | Bowers et al. |
| D775,622 S | 1/2017 | Fu et al. |
| D775,989 S | 1/2017 | Kalanick et al. |
| D777,258 S | 1/2017 | Strempack et al. |
| D777,695 S | 1/2017 | Odryna et al. |
| 9,622,392 B1 | 4/2017 | Bowers et al. |
| D786,453 S | 5/2017 | Indio da Costa et al. |
| D786,454 S | 5/2017 | Indio da Costa et al. |
| D791,069 S | 7/2017 | Mota et al. |
| D792,833 S | 7/2017 | Chan |
| D793,890 S | 8/2017 | Hong |
| D795,453 S | 8/2017 | Indio da Costa et al. |
| D797,658 S | 9/2017 | Feller et al. |
| D804,054 S | 11/2017 | Indio da Costa et al. |
| D806,895 S | 1/2018 | Terashima et al. |
| D807,840 S | 1/2018 | Lee et al. |
| D813,802 S | 3/2018 | Krantz et al. |
| D815,690 S | 4/2018 | Squillante |

(56) References Cited

U.S. PATENT DOCUMENTS

| | | |
|---|---|---|
| D816,624 S | 5/2018 | Odryna et al. |
| D817,288 S | 5/2018 | Won et al. |
| D820,798 S | 6/2018 | Yurusov |
| 9,994,160 B2 | 6/2018 | Kim et al. |
| D831,599 S | 10/2018 | Chong et al. |
| D835,926 S | 12/2018 | Abatemarco, Jr. |
| D839,352 S | 1/2019 | Lim et al. |
| 10,278,311 B2 | 4/2019 | DeMars |
| D848,528 S | 5/2019 | Lee et al. |
| D848,529 S | 5/2019 | Lee et al. |
| 10,290,243 B2 | 5/2019 | Lanham |
| 10,326,962 B2 | 6/2019 | Hamilton |
| D856,530 S | 8/2019 | Oskoui |
| D861,623 S | 10/2019 | Odryna et al. |
| D863,597 S | 10/2019 | Li et al. |
| 10,486,618 B2 | 11/2019 | Hornsby et al. |
| D869,378 S | 12/2019 | Hornsby et al. |
| D878,467 S | 3/2020 | Hornsby et al. |
| D879,202 S | 3/2020 | Hornsby et al. |
| D883,278 S | 5/2020 | Yepez et al. |
| D885,382 S | 5/2020 | Kim et al. |
| 10,757,844 B2 | 8/2020 | Dunn et al. |
| 10,820,445 B2 | 10/2020 | Diaz |
| D902,836 S | 11/2020 | Hornsby et al. |
| 10,827,657 B2 | 11/2020 | Lee |
| 10,831,050 B2 | 11/2020 | Dunn et al. |
| D913,276 S | 3/2021 | Dunn |
| D913,277 S | 3/2021 | Dunn |
| D913,278 S | 3/2021 | Dunn |
| D916,189 S | 4/2021 | Dunn |
| D916,190 S | 4/2021 | Dunn |
| D916,319 S | 4/2021 | Dunn |
| D916,971 S | 4/2021 | Dunn |
| D916,972 S | 4/2021 | Dunn |
| D916,973 S | 4/2021 | Dunn |
| D916,974 S | 4/2021 | Dunn |
| D916,975 S | 4/2021 | Dunn |
| D916,976 S | 4/2021 | Dunn |
| D916,977 S | 4/2021 | Dunn |
| 10,994,669 B2 | 5/2021 | Hornsby et al. |
| 11,100,822 B2 | 8/2021 | Hornsby et al. |
| D934,159 S | 10/2021 | Dunn et al. |
| 11,148,621 B2 | 10/2021 | Dunn et al. |
| 11,164,491 B2 | 11/2021 | Hornsby et al. |
| 11,203,312 B2 | 12/2021 | Dunn et al. |
| D941,235 S | 1/2022 | Dunn et al. |
| D941,236 S | 1/2022 | Dunn et al. |
| 11,285,895 B2 | 3/2022 | Dunn et al. |
| D957,317 S | 7/2022 | Dunn |
| D958,059 S | 7/2022 | Dunn |
| D964,920 S | 9/2022 | Dunn |
| D969,066 S | 11/2022 | Dunn |
| D969,067 S | 11/2022 | Dunn |
| D969,068 S | 11/2022 | Dunn |
| 11,496,091 B2 | 11/2022 | Dunn et al. |
| 11,505,145 B2 | 11/2022 | Dunn et al. |
| 11,545,057 B2 | 1/2023 | Hornsby et al. |
| 2002/0009978 A1 | 1/2002 | Dukach et al. |
| 2002/0065046 A1 | 5/2002 | Mankins et al. |
| 2002/0084891 A1 | 7/2002 | Mankins et al. |
| 2002/0112026 A1 | 8/2002 | Fridman et al. |
| 2002/0159270 A1 | 10/2002 | Lynam et al. |
| 2002/0164962 A1 | 11/2002 | Mankins et al. |
| 2003/0119448 A1 | 6/2003 | Arntz |
| 2004/0004827 A1 | 1/2004 | Guest |
| 2004/0036622 A1 | 2/2004 | Dukach et al. |
| 2004/0170013 A1 | 9/2004 | Smythe |
| 2004/0182898 A1 | 9/2004 | Harris |
| 2005/0051684 A1 | 3/2005 | Linden |
| 2005/0116511 A1 | 6/2005 | Eroy et al. |
| 2006/0091170 A1 | 5/2006 | Almhil |
| 2007/0108243 A1 | 5/2007 | Bingham |
| 2007/0158965 A1 | 7/2007 | Van Smirren |
| 2007/0252409 A1 | 11/2007 | Clinton et al. |
| 2008/0083800 A1 | 4/2008 | Mathew |
| 2008/0146147 A1 | 6/2008 | Streeter |
| 2008/0236007 A1 | 10/2008 | Au et al. |
| 2008/0298051 A1 | 12/2008 | Chu |
| 2008/0313193 A1* | 12/2008 | Mestman ............... G06F 1/3203 |
| 2009/0050194 A1 | 2/2009 | Noble et al. |
| 2009/0183405 A1 | 7/2009 | Wilkes |
| 2010/0079979 A1 | 4/2010 | Nakamichi et al. |
| 2010/0097819 A1 | 4/2010 | Schellens |
| 2010/0282799 A1 | 11/2010 | Hubbard |
| 2011/0072697 A1 | 3/2011 | Miller |
| 2011/0075363 A1 | 3/2011 | Nakamichi et al. |
| 2011/0132946 A1 | 6/2011 | Sautter et al. |
| 2011/0298841 A1 | 12/2011 | Fujimori |
| 2011/0315726 A1 | 12/2011 | Huhn et al. |
| 2012/0002357 A1 | 1/2012 | Auld et al. |
| 2012/0061198 A1 | 3/2012 | Asatsuke et al. |
| 2012/0131936 A1 | 5/2012 | Yoshida et al. |
| 2012/0224116 A1 | 9/2012 | Barnes |
| 2012/0312848 A1 | 12/2012 | Delusky et al. |
| 2013/0033222 A1 | 2/2013 | Hixson et al. |
| 2013/0098425 A1 | 4/2013 | Amin et al. |
| 2013/0173358 A1 | 7/2013 | Pinkus |
| 2014/0293605 A1 | 10/2014 | Chemel et al. |
| 2015/0108299 A1 | 4/2015 | Seal |
| 2015/0122857 A1 | 5/2015 | Ferman et al. |
| 2015/0129625 A1 | 5/2015 | Gorey et al. |
| 2015/0175082 A1 | 6/2015 | Aftanas et al. |
| 2015/0194561 A1 | 7/2015 | Toya et al. |
| 2015/0221899 A1 | 8/2015 | Knapp et al. |
| 2015/0232038 A1 | 8/2015 | Robertson |
| 2015/0274084 A1 | 10/2015 | Sargès et al. |
| 2015/0369274 A1 | 12/2015 | Stojkovic et al. |
| 2015/0381922 A1 | 12/2015 | Hamilton |
| 2016/0041423 A1 | 2/2016 | Dunn |
| 2016/0132849 A1 | 5/2016 | Melo et al. |
| 2016/0249493 A1 | 8/2016 | Dunn et al. |
| 2017/0029043 A1 | 2/2017 | Clark et al. |
| 2017/0050576 A1 | 2/2017 | Ferman |
| 2017/0111486 A1 | 4/2017 | Bowers et al. |
| 2017/0111520 A1 | 4/2017 | Bowers et al. |
| 2017/0129356 A1* | 5/2017 | Johnson ................ B60L 53/63 |
| 2017/0132960 A1 | 5/2017 | Kis-Benedek Pinero et al. |
| 2017/0179584 A1 | 6/2017 | Nakada et al. |
| 2017/0257978 A1 | 9/2017 | Diaz |
| 2018/0170270 A1 | 6/2018 | Bergman |
| 2018/0172239 A1 | 6/2018 | Wacker et al. |
| 2018/0265019 A1 | 9/2018 | Dry et al. |
| 2018/0272959 A1 | 9/2018 | Hornsby et al. |
| 2018/0293921 A1 | 10/2018 | Margrill |
| 2018/0317330 A1 | 11/2018 | Dunn et al. |
| 2018/0345809 A1 | 12/2018 | Derrien et al. |
| 2019/0295386 A1 | 9/2019 | Roberts |
| 2020/0010025 A1 | 1/2020 | Hornsby et al. |
| 2020/0039450 A1 | 2/2020 | Hornsby et al. |
| 2020/0148126 A1 | 5/2020 | Griffith et al. |
| 2020/0207284 A1 | 7/2020 | Hornsby et al. |
| 2020/0288585 A1 | 9/2020 | Dunn et al. |
| 2021/0061183 A1 | 3/2021 | Dunn et al. |
| 2021/0061197 A1 | 3/2021 | Dunn et al. |
| 2021/0061198 A1 | 3/2021 | Dunn et al. |
| 2021/0066923 A1 | 3/2021 | Dunn et al. |
| 2021/0221304 A1 | 7/2021 | Hornsby et al. |
| 2021/0313927 A1 | 10/2021 | Dunn et al. |
| 2021/0358350 A1 | 11/2021 | Hornsby et al. |
| 2022/0073021 A1 | 3/2022 | Dunn et al. |
| 2022/0148467 A1 | 5/2022 | Dunn et al. |

FOREIGN PATENT DOCUMENTS

| | | |
|---|---|---|
| AU | 201815721 | 10/2018 |
| AU | 2018237580 B2 | 1/2021 |
| AU | 2020294292 B2 | 10/2022 |
| CA | 183485 | 12/2019 |
| CA | 183486 | 12/2019 |
| CA | 183487 | 12/2019 |
| CA | 3057321 C | 11/2022 |
| CN | 201228893 Y | 4/2009 |
| CN | 106782121 A | 5/2017 |
| CN | 109961695 A | 7/2019 |

(56) References Cited

FOREIGN PATENT DOCUMENTS

| | | |
|---|---|---|
| DE | 202007017477 U1 | 6/2008 |
| EM | 005638509-0001 | 9/2018 |
| EM | 005638541-0001 | 9/2018 |
| EM | 005638558-0001 | 9/2018 |
| EM | 008035232-0001 | 7/2020 |
| EP | 0476288 A1 | 3/1992 |
| EP | 1065747 B1 | 3/2005 |
| EP | 3040766 A1 | 7/2016 |
| EP | 3602534 A1 | 2/2020 |
| EP | 3910617 A1 | 11/2021 |
| EP | 4022595 A1 | 7/2022 |
| JP | 8-216779 A | 8/1996 |
| JP | H10-309995 A | 11/1998 |
| JP | 2001-151027 A | 6/2001 |
| JP | 2001-249402 A | 9/2001 |
| JP | 3094183 U | 3/2003 |
| JP | 2006-53187 A | 2/2006 |
| JP | 2012-16086 A | 1/2012 |
| JP | 2012-255847 A | 12/2012 |
| JP | 2012-255848 A | 12/2012 |
| JP | 1634158 S | 5/2019 |
| JP | 1634159 S | 5/2019 |
| JP | 1660382 S | 5/2020 |
| JP | 6855593 B2 | 3/2021 |
| KR | 10-2004-0039823 A | 5/2004 |
| KR | 300422537.0000 | 8/2006 |
| KR | 10-0917344 B1 | 9/2009 |
| KR | 10-1444022 B1 | 10/2014 |
| KR | 30-1045258 | 2/2020 |
| KR | 30-1045259 | 2/2020 |
| KR | 30-1045260 | 2/2020 |
| KR | 10-2407469 B1 | 6/2022 |
| WO | 2014/195560 A1 | 12/2014 |
| WO | 2016/102980 A1 | 6/2016 |
| WO | D098725-001 | 12/2017 |
| WO | 2018/175888 A1 | 9/2018 |
| WO | 2021/041381 A1 | 3/2021 |

OTHER PUBLICATIONS

CIVIQ Smartscapes, Connecting people, places & experiences, webpage, Jan. 30, 2019, 5 pages.
CIVIQ Smartscapes, Connecting people, places & experiences, screen shot of devices webpage, Jan. 30, 2019, 1 page.
Melford Technologies, Part 1, video online at https://m.youtube.com/watch?v=OAV7zzVrHtE&feature=youtu.be, Oct. 21, 2019, 1 page.
Manufacturing Resources International, Manufacturing Resources International home webpage, Nov. 4, 2019, 2 pages.
Manufacturing Resources International, LCD Display Deployments webpage, Nov. 4, 2019, 3 pages.
Manufacturing Resources International, BoldVu Outdoor LCD Display webpage, Nov. 4, 2019, 2 pages.
Manufacturing Resources International, BoldVu Semi Outdoor LCD Display webpage, Nov. 8, 2019, 2 pages.
Manufacturing Resources International, BoldVu Vehicle Top LCD Display webpage, Nov. 8, 2019, 2 pages.
Manufacturing Resources International, Drivethru Menu Boards Webpage, Nov. 8, 2019, 2 pages.
Manufacturing Resources International, Storefront Digital Signage webpage, Nov. 8, 2019, 2 pages.
Vertigo Digital Displays, Innovation on Display FlexVu Totem Brochure, 2014, 6 pages.
Vertigo Digital Displays, FlexVu Totem Shelter, 2017, 2 pages.
Vertigo Digital Displays, All Products Catalogue, 2017, 14 pages.
CIVIQ Smartscapes, FlexVue Ferro 55P/55L, Mar. 16, 2017, 4 pages.
Gable, Blog Post: The Anatomy of an Interactive Kiosk, Aug. 15, 2018, 4 pages.
Adnation, Miller photos, May 9, 2017, 28 pages.
LG-MRI, BoldVu Vehicle Top Displays, via Internet Archive Wayback Machine at URL: https://web.archive.org/web/20190327001140/https://lg-mri.com/digital-taxi-top-display/, Mar. 27, 2019, 8 pages.
Mcgarrybowen, Inside the Campaign: United Airlines "Real Time Taxi", https://www.aaaa.org/inside-campaign-united-airlines-real-time-taxi-mcgarrybowen-media-partners-kinetic-mec-verifone/, Jul. 7, 2017, 6 pages, American Association of Advertising Agencies.
Rave, DSE 2017: LG-MRI Presents TaxiVu, a Digital LCD Display for Mobile Advertising, video at https://www.youtube.com/watch?v=CmNw40BT6ZE, Mar. 30, 2017, 1 page.
Rave, DSE 2018: LG-MRI Highlights BoldVu Vehicle Top Display, VT1145LD, for DOOH Advertising, video at https://www.youtube.com/watch?v=IYSMhCnMyhg, Apr. 1, 2018, 1 page.
Adnation, Turn Key Solutions, May 23, 2017, 4 pages.
Gizmodo, Uber Will Puts Ads on Top of Vehicles Just Like Old-School Taxis, Feb. 24, 2020, 4 pages.
The Street, Lyft Acquires Halo Cars, a Startup That Places Ads on Vehicles, Feb. 21, 2020, 2 pages.
Marketingdive, Puma brings targeted hologram ads to car roofs for NBA All-Star game, Feb. 20, 2020, 3 pages.
Deploy Solution, Melford Technologies homepage, Mar. 3, 2020, 4 pages.
Commercial Integrator, WaiveCar Brings Car Sharing and Digital Signage Together with Help from BrightSign, Jul. 6, 2018, 9 pages.
Alie Express, P5 LED taxi top led display, wireless P5 car roof advertising led sign 960mm x 320mm two sides, webpage, accessed Apr. 8, 2021, 13 pages.
Youtube, Road Runner Media, Digital Break Light Video, screen shot of video portion, Jun. 1, 2020, 1 page.
Youtube, Road Runner Media, Roadrunner Media for McDonalds video, screen shot of video portion, Jun. 4, 2020, 1 page.

\* cited by examiner

ELECTRONIC DISPLAY ASSEMBLIES WITH SOLAR PANELS

CROSS-REFERENCE TO RELATED APPLICATIONS

This application is a continuation of U.S. application Ser. No. 17/339,837 filed Jun. 4, 2021, which is a continuation-in-part of U.S. application Ser. No. 17/001,916 filed Aug. 25, 2020, which claims the benefit of U.S. Provisional Application No. 62/892,104 filed Aug. 27, 2019 and U.S. Provisional Application No. 62/911,806 filed Oct. 7, 2019, the disclosures of each of which are hereby incorporated by reference as if fully restated herein.

TECHNICAL FIELD

Exemplary embodiments relate generally to electronic display assemblies, particularly those for outdoor use, with solar panels.

BACKGROUND AND SUMMARY OF THE INVENTION

Electronic displays are increasingly replacing physical billboards, bulletins, posters, flyers, banners, and other physical signage for public announcements, advertising, and the like. Such physical signage is commonly provided along sidewalks, along roadsides, at bus shelters, on poles, at drive throughs, on vehicle toppers, and the like. Ruggedized displays have also been provided for indoor, outdoor, and semi-outdoor use. Such displays may protect the electronic displays and related components from the elements, vandalism, theft, and the like, and may be configured to display public announcements, advertising, and the like. Examples of such displays include those available from Manufacturing Resources International, Inc. of Alpharetta, Georgia (https://mri-inc.net/). These displays may be provided on sidewalks, on the ground, in windows, at bus shelters, at drive throughs, on the tops of vehicles, and the like to replace physical signage.

Advancements in solar energy technology have made solar panels more compact and efficient. Displays require power for operation. For example, such displays may utilize lights, electronic displays, fans and other cooling equipment, electrical circuitry and other electrically powered equipment which requires electrical power for operation. Generally, such power is provided by the electrical grid, but increasing public interest in the use of alternative energy sources (e.g., solar panels) creates a desire for displays which do not draw power from the electrical grid, or at least not as much.

An electronic display assembly with one or more solar panels is provided. The electronic display assembly may be configured for outdoor use. For example, without limitation, the electronic display assembly may be configured for mounting to a sidewalk, to a bus shelter, to the ground, at a drive through canopy, to a pole, or the like. The electronic display assembly may be integrated with various street furniture including, but not limited to, a bus shelter, a bench, a wall, a light pole, a drive through canopy, some combination thereof, or the like. Each electronic display assembly may comprise one or more display units. Any number, type, size, and orientation of such display units may be utilized.

One or more supports may extend between the electronic display assembly and one or more solar energy harvesting devices such that the one or more solar energy harvesting devices are elevated above a housing for the electronic display assembly. This may provide the clearance needed for the performance of maintenance efforts on the electronic display assembly.

The elevation of the one or more solar energy harvesting devices may also cast shade on various components of the electronic display assembly, such as but not limited to, the display units. This may improve the contrast of images displayed on the electronic display, and may lower brightness requirements. Doing so may reduce the solar load experienced by the electronic display assembly. Together or separately, these improvements may also reduce thermal management demands. In exemplary embodiments, the one or more solar energy harvesting devices may be longer and/or wider than the electronic display assembly to provide such shade. This may also increase the available area for solar power. Any number, size, type, location, and orientation of such solar energy harvesting devices may be utilized.

The display units may be configured to directly accept both AC and DC power. Power generated by the solar energy harvesting devices may be used to directly power the display units when conditions are sufficiently sunny, and may be directly supplied to the display units in DC form. When the power generated by the one or more solar energy harvesting devices is insufficient to power the electronic display assemblies, only the additional energy required may be drawn from the electrical grid, one or more energy storage devices, some combination thereof, and/or the like. This power may be directly supplied to the display units in AC form. During daytime hours, the power consumption of the electronic display assemblies is typically relatively high because more brightness is needed to provide adequate viewing conditions. During nighttime hours, the power consumption of the electronic display assemblies is typically relatively low because less brightness is needed to provide adequate viewing conditions. The use of such solar energy harvesting devices may reduce the environmental impact of such electronic display assemblies.

Integrating bulk energy storage devices (e.g., batteries), charging equipment, and/or electricity generation equipment with such display units may provide an opportunity to present advertising or other information to persons dwelling in close physical proximity to the display units, such as to charge their vehicles, personal electronic devices, combinations thereof, or the like. The solar energy harvesting devices may fully or partially provide the energy for such charging, though such is not necessarily required. Alternatively, or additionally, the bulk energy storage devices and/or electricity generation equipment may fully or partially power the display units, or components thereof, such as but not limited to, electronic displays, cooling equipment, combinations thereof, or the like, though such is not necessarily required. Such bulk energy storage devices, charging equipment, and/or electricity generation equipment may be, wholly or partially, physically separate from the electronic display(s) to reduce the transfer of heat generated therefrom, though such is not required. However, the electronic display(s), and/or associated components, may be in electrical connection with the bulk energy storage devices, charging equipment, and/or electricity generation equipment.

The solar energy harvesting devices may have a larger footprint than the bulk energy storage portion, charging equipment, and/or electronic display portion. The solar energy harvesting devices may be positioned above in an elevated position above the bulk energy storage portion, charging equipment, and/or electronic display portion to extend over the same in a canopy arrangement such that shade is periodically or continuously cast on one or more of the bulk energy storage portion, charging equipment, and/or electronic display portion. This may provide increased contrast at the electronic display(s), thereby improving image quality. This may, alternatively or additionally, provide cooling to the bulk energy storage portion, charging equipment, and/or electronic display portion which may normally generate heat when operational, thereby decreasing cooling demands, maximizing energy storage, combinations thereof, or the like. This may also provide shade to nearby persons, increasing the desirability of dwelling in such places. One or more items of street furniture, such as but not limited to waste disposal containers, may be integrated with, or otherwise associated with, the bulk energy storage portion, charging equipment, and/or electronic display portion.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
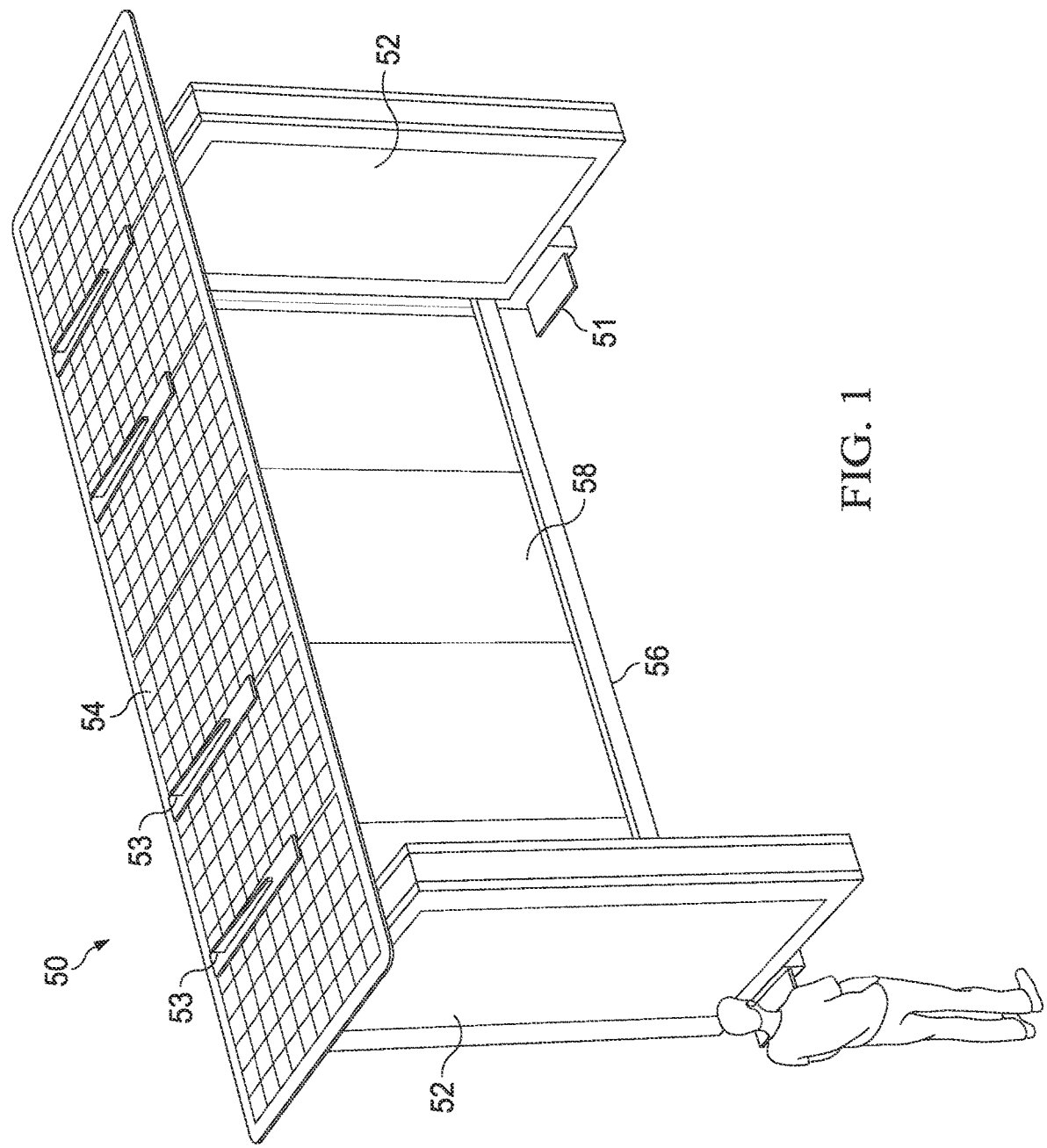
FIG. 1 is a perspective view of an exemplary bus shelter with display units and solar energy harvesting devices (the "bus shelter assembly")
Figure 2:
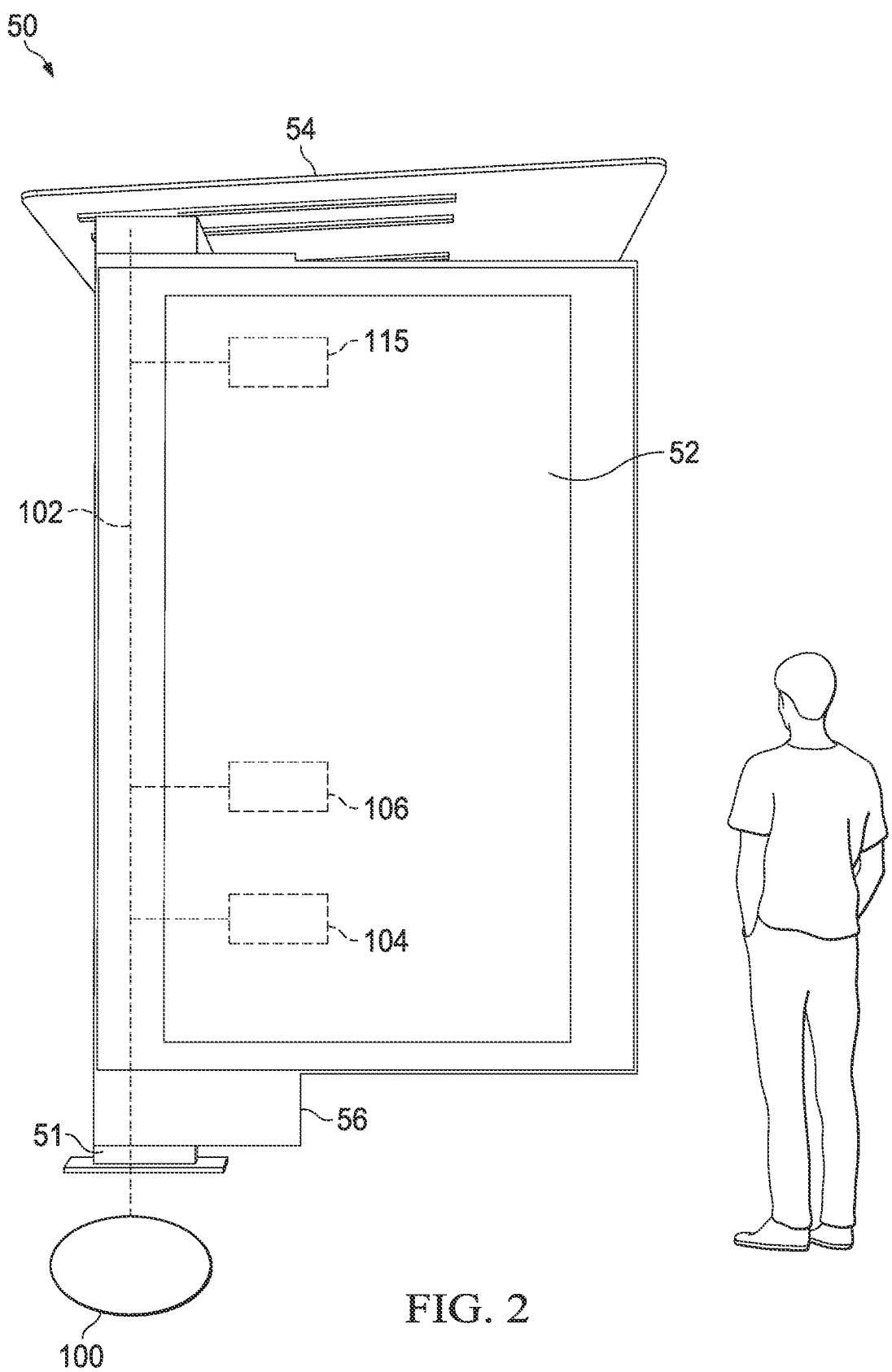
FIG. 2 is a left side view of the bus shelter assembly of FIG. 1 with certain internal components revealed and illustrated in simplified form.
Figure 3:
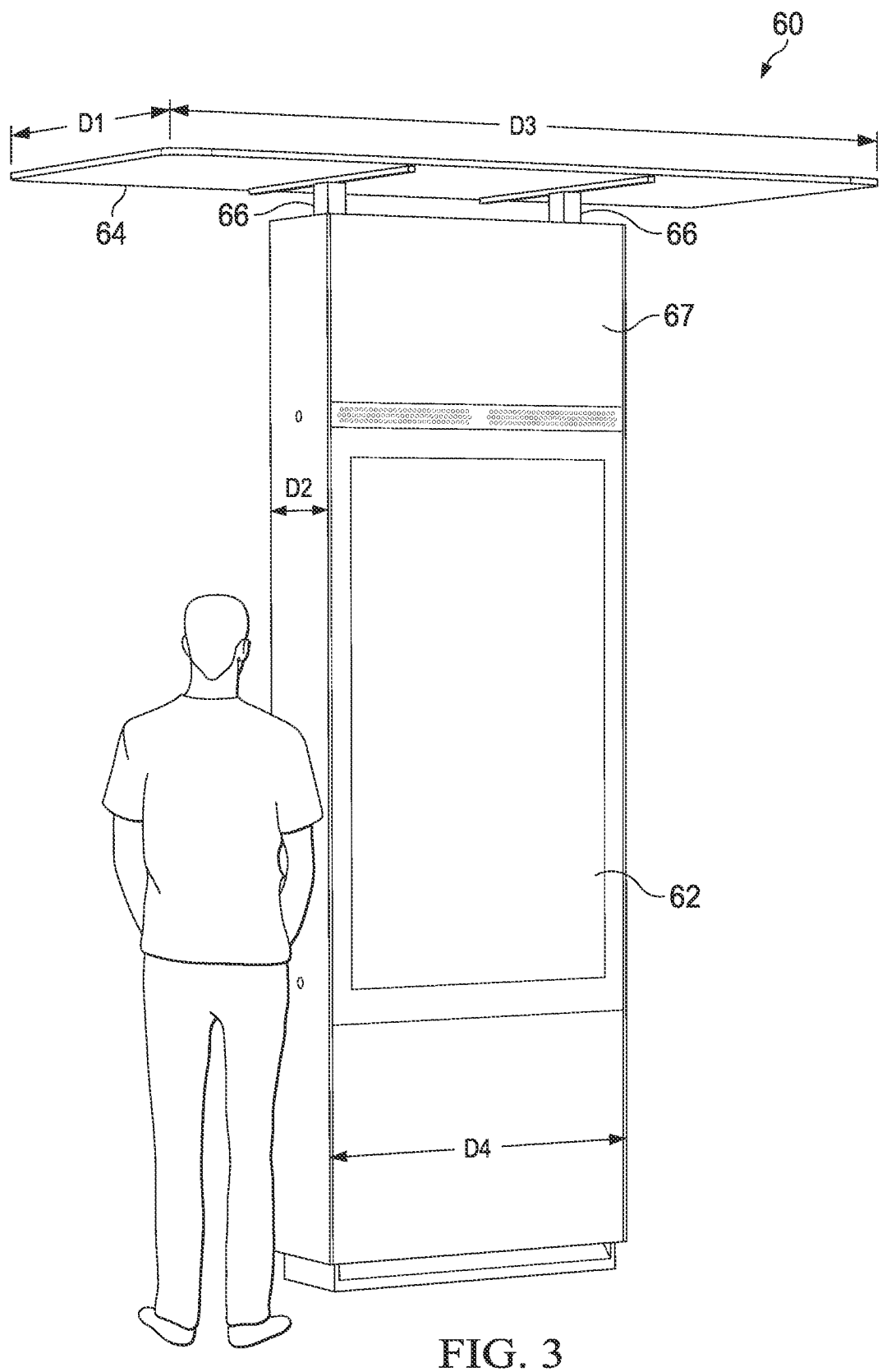
FIG. 3 is a perspective view of an exemplary surface mounted electronic display assembly with solar energy harvesting devices (the "surface mounted assembly")
Figure 4:
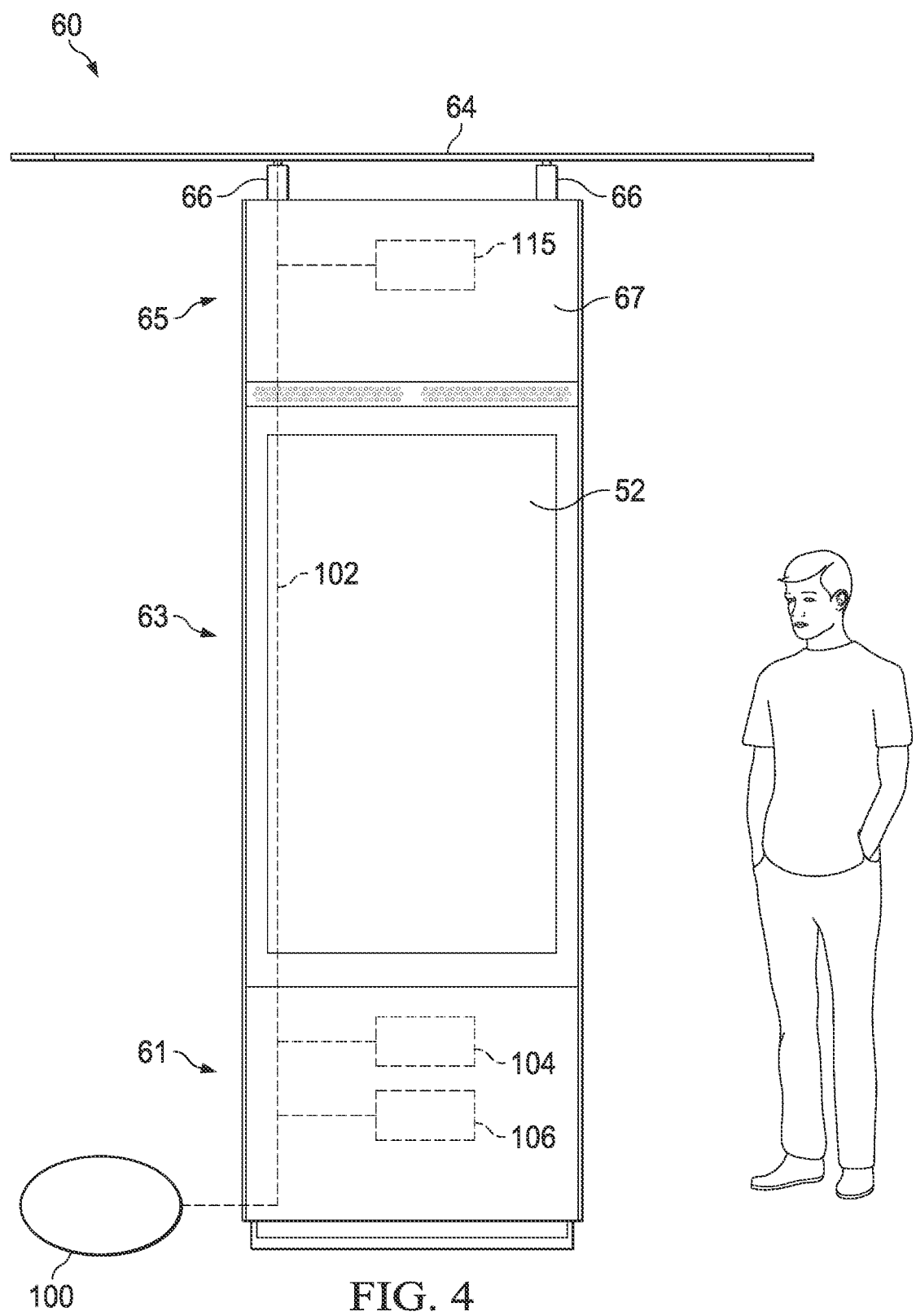
FIG. 4 is a rear view of the surface mounted assembly of FIG. 3 with certain internal components revealed and illustrated in simplified form.
Figure 5:
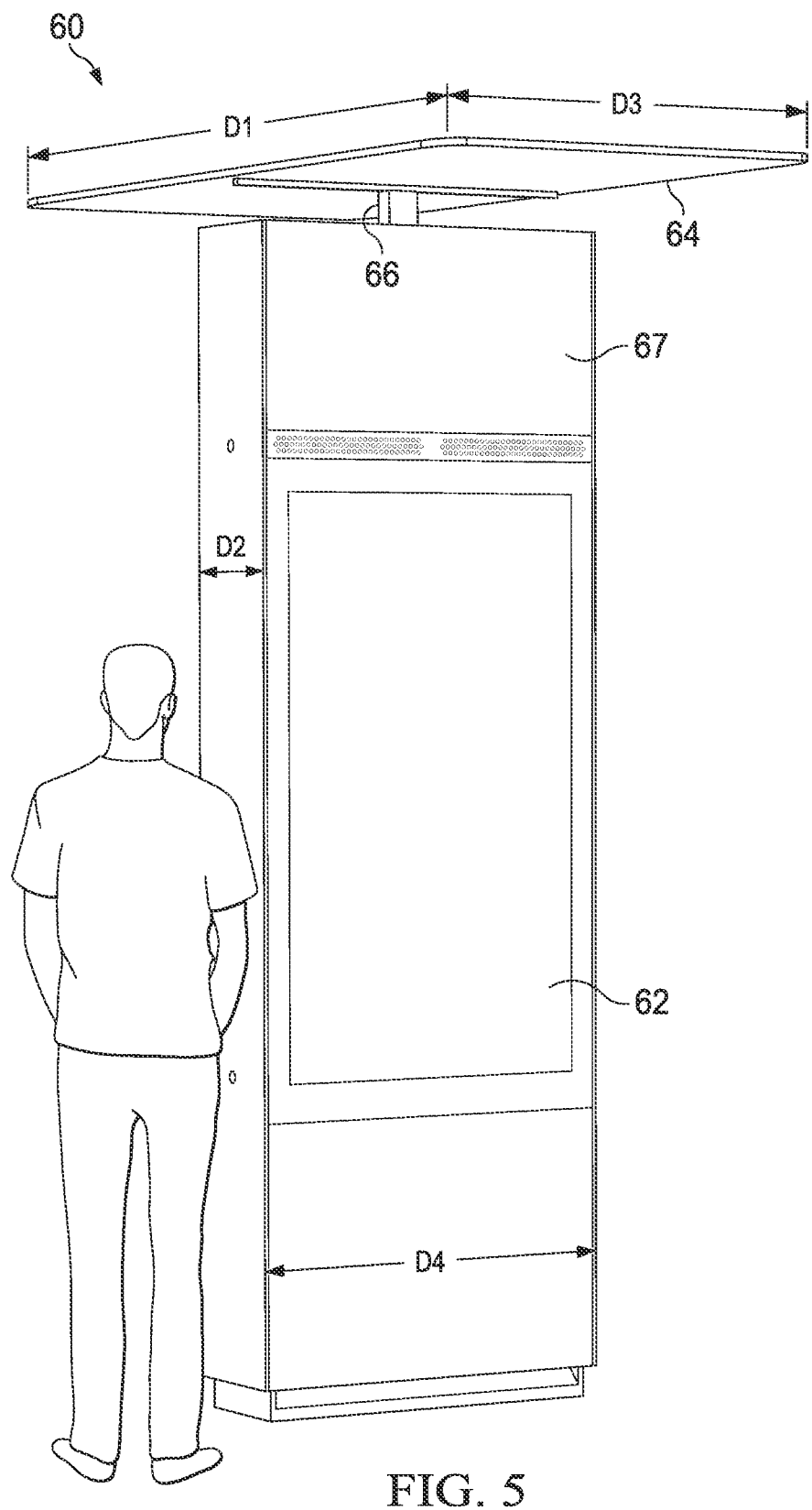
FIG. 5 is a perspective view of another exemplary surface mounted assembly.
Figure 6:
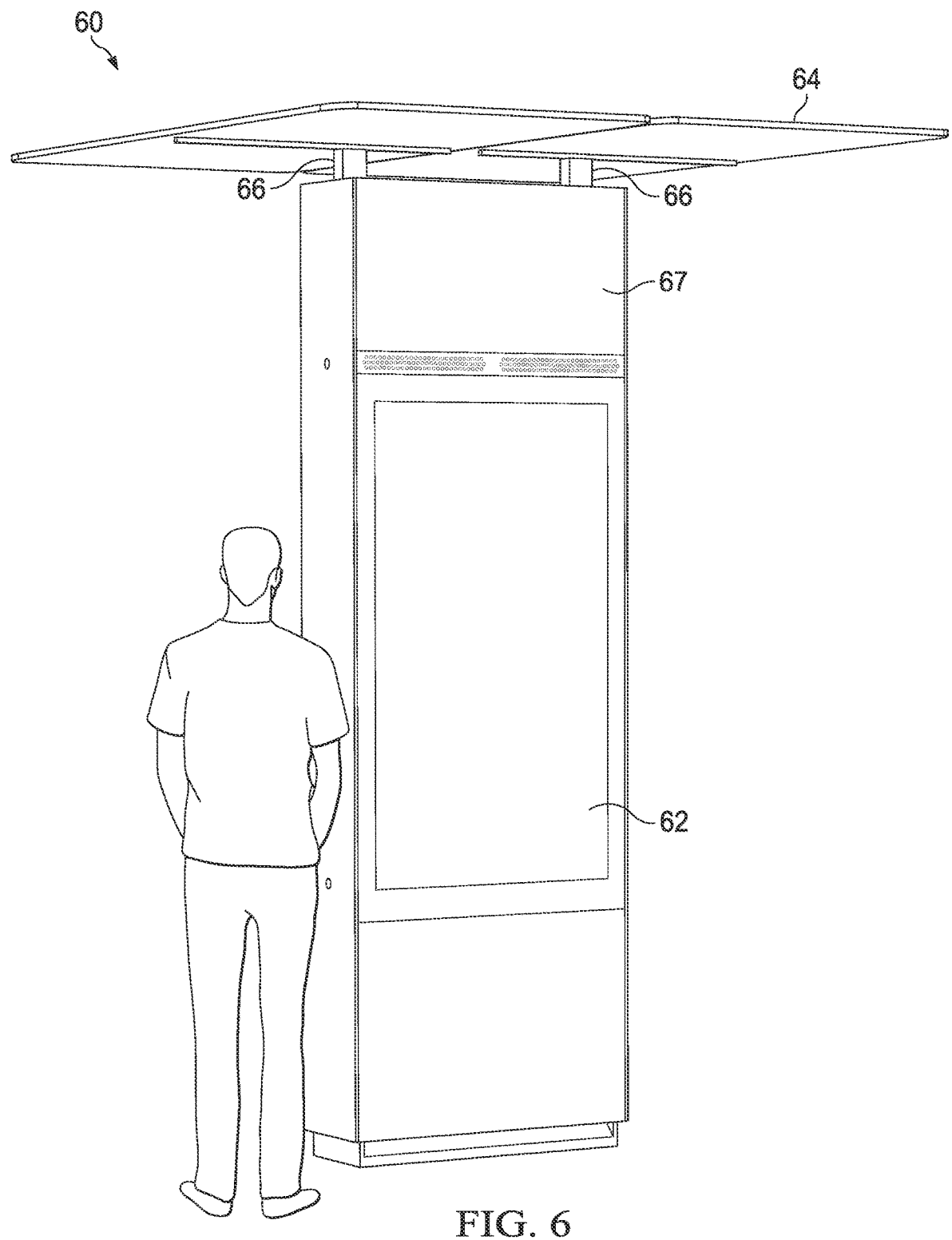
FIG. 6 is a perspective view of another exemplary surface mounted assembly.
Figure 7:
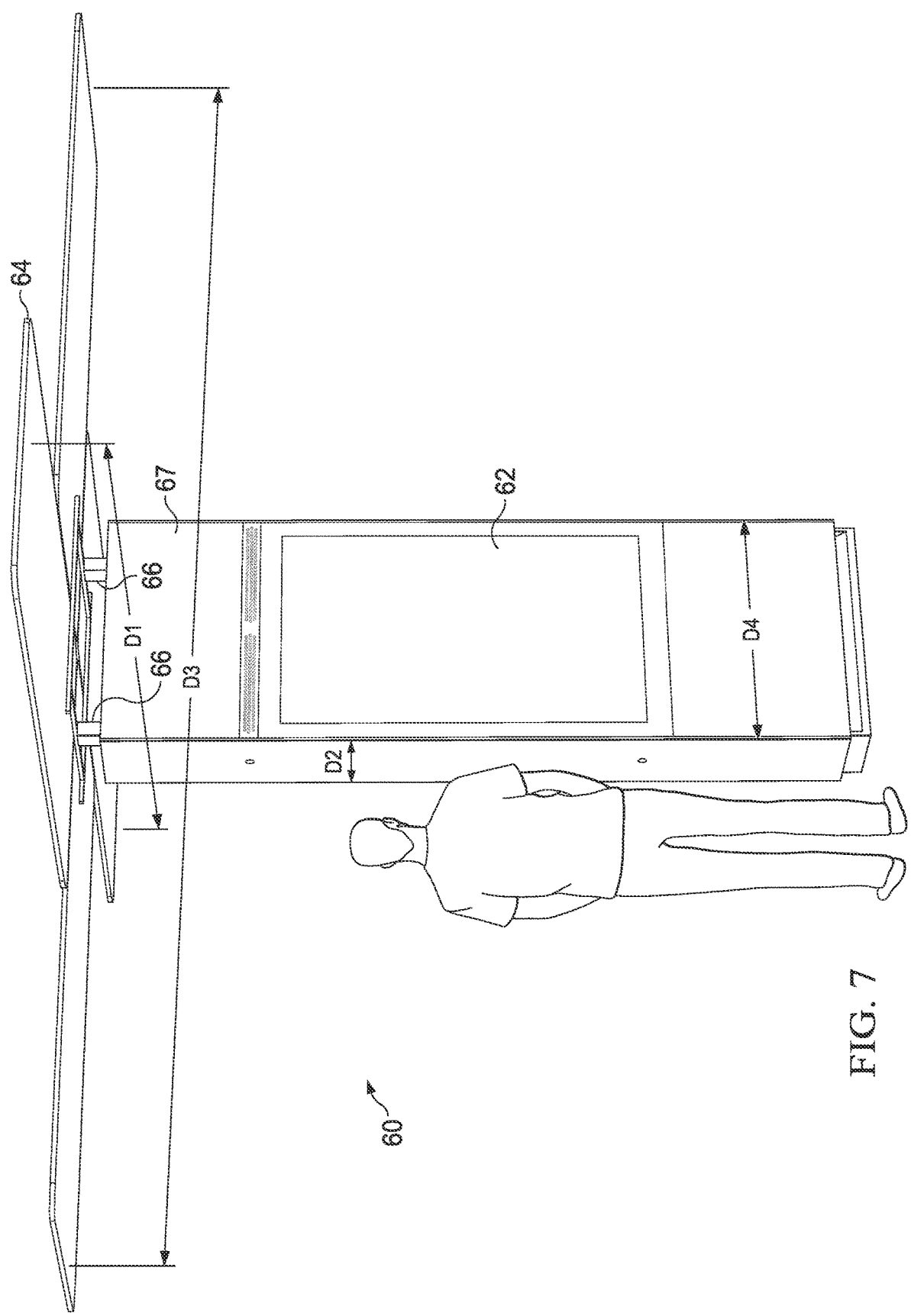
FIG. 7 is a perspective view of another exemplary surface mounted assembly.

FIG. 1 and FIG. 2 illustrate exemplary bus shelter assemblies 50. The bus shelter assembly 50 may comprise one or more members 56 forming the structure of the bus shelter assembly 50. One or more feet 51 may be provided for attaching the bus shelter assembly 50 to a sidewalk, the ground, a parking lot, or the like. One or more panels 58 may be located along a rear wall of the bus shelter assembly 50. The panels 28 may be located between at least two of the members 56. The panels 28 may be comprised of an opaque, transparent, or translucent material. Any design, type, or style of bus shelter assembly 50 may be utilized.

The bus shelter assembly 50 may comprise one or more display units 52. The display units 52 may be configured to display, for example, advertisements, public service announcements, and the like. These display units 52 may include displays of any type, size, orientation, and/or shape without departing from the scope of the present disclosure. Further, these display units 52 may be mounted at any suitable location on the bus shelter assembly 50 such as, for example, on either side of the bus shelter assembly 50 and/or to the members 56.

One or more solar energy harvesting devices 54 may be mounted along, or may form, the roof of the bus shelter assembly 50. Where members 56 are provided that form the structure of the roof, the solar energy harvesting device 54 may be mounted onto said members 56. The solar energy harvesting devices 54 may provide shade, rain, and other weather protection for individuals using the bus shelter assembly 50. In exemplary embodiments, the solar energy harvesting devices 54 may extend over one or more of the display units 52 to provide at least partial shade to the display units 52. Though the solar energy harvesting devices 54 may be employed to provide shade, the solar energy harvesting devices 54 may be opaque. However, in other exemplary embodiments, the solar energy harvesting devices 54 may be transparent and/or translucent.

Various roof members 53 may be located between the individual panels of the solar energy harvesting devices 54 to provide structural support and rigidity. As such, it is generally contemplated that said roof members 53 may be of sufficient strength, rigidity, and other material properties so as to provide such structural support and rigidity. In one or more examples, the roof members 53 may be configured to support the solar energy harvesting devices 54 at an angle to improve solar energy gathering.

An electrical pathway 102 may be provided between the solar energy harvesting devices 54 and the display units 52. Through this electrical pathway 102, electrical energy generated by the solar energy harvesting devices 54 may be routed to the display units 52 to power the same. A controller 106 may be located along the electrical pathway 102 and configured to direct the flow of electrical energy, depending on where it is needed. For example, the controller 106 may be configured to direct the display units 52 to utilize electrical energy from the solar energy harvesting devices 54, an electrical grid 100, some combination thereof, and/or the like. Alternatively, or additionally, the controller 106 may be configured to monitor electrical draw from the display units 52 and/or electrical production from the solar energy harvesting device 54. Electrical draw and production may be monitored (e.g., quantified) using any suitable measurement value such as, for example without limitation, micro-watts. In monitoring this information, the controller 106 may be configured to determine which energy source(s) to utilize for one or more components of the bus shelter assembly 50.

One or more sensors 115 may be utilized to detect the power generated by the solar energy harvesting device 54. Data from the sensors 115 may be used by the controller 106 to control operations. The electrical pathway 102, the controller 106, and the sensors 115 may be located internally within the display units 52, one or more of the members 56, the solar energy harvesting device 54, other component of the bus shelter assembly 50, or may be external to the bus shelter assembly 50. The controller 106 may be interposed between the display units 52, the electrical grid 100, and the solar energy harvesting device 54.

FIG. 3 through FIG. 7 illustrate exemplary sidewalk assemblies 60. The sidewalk assemblies 60 may be configured for placement in any suitable location, such as sidewalks, parking lots, and/or other public places, and may be mounted to the ground, a sidewalk, a parking lot, a wall, a building, or another structure or surface. Each surface mounted assembly 60 may include one or more display units 62, support members 66, and solar energy harvesting devices 64. Further, each display unit 64 may include one or more electronic displays.

Sidewalk assemblies 60 having more than one display unit 62 may position said display units 62 in any suitable arrangement. For example, without limitation, a single, double, triple, or quadruple sided set of display units 62 may be provided in a given surface mounted assembly 60. Similarly, the electronic displays within each display unit 62 may also be positioned in any suitable arrangement. Any number, size, arrangement, and type of electronic displays may be utilized. Further, each electronic display may be provided in the same or a separate display unit 62, which may be physically connected to one another such as in a triangular or rectangular shape.

One or more support members 66 may extend above the display units 62 to one or more solar energy harvesting devices 64. Practically speaking, the support member(s) 66 support the weight the solar energy harvesting devices 64 and, as such, should generally comprise the strength and rigidity required to do so. The support members 66 may be assembled in any suitable arrangement. For example, the support member 66 may extend from an upper surface of a housing 67. In another example, the support members 66 may be anchored within the display units 62 or other components of the surface mounted assembly 60.

The one or more solar energy harvesting devices 64 may have a maximum first dimension D1 which extends beyond the maximum second dimension D2 of the surface mounted assembly 60. The dimensions D1 and D2 may be depth of the solar energy harvesting devices 64 and the surface mounted assembly 60, respectively. Alternatively, or additionally, the one or more solar energy harvesting devices 64 may have a maximum third dimension D3 which extends beyond the maximum fourth dimension D4 of the surface mounted assembly 60. The dimensions D3 and D4 may be width of the solar energy harvesting devices 64 and the surface mounted assembly 60, respectively. Stated another way, the solar energy harvesting devices 64 may have a footprint which extends beyond the footprint of the surface mounted assembly 60. In this way, the solar energy harvesting devices 64 may shade some or all of the display units 62 of the surface mounted assembly 60. While D1, D2, D3, and D4 may represent maximum dimensions, one or more of D1, D2, D3, and/or D4 may represent minimum dimensions. For example, without limitation, the minimum dimensions of the solar energy harvesting devices 64, D1 and/or D3, may be greater than the maximum dimensions of the surface mounted assembly 60, D2 and D4.

The solar energy harvesting devices 64 may extend laterally. Stated another way, the solar energy harvesting devices 64 may extend along the width of the display units 62. Stated yet another way, the solar energy harvesting devices 64 may extend from left to right or right to left when viewed from the front or rear. Alternatively, or additionally, the solar energy harvesting devices 64 may be oriented to extend towards or away from an intended viewer of the display units 62 when viewed from the front or rear. Stated another way, the solar energy harvesting devices 64 may extend along the depth of the display units 62 when viewed from the front or rear. Stated yet another way, the solar energy harvesting devices 64 may extend into or out of the page when viewed from the front or rear of the surface mounted assembly 60.

Any number of solar energy harvesting devices 64 may be provided in any orientation. For example, without limitation, two of the solar energy harvesting devices 64 may be provided to extend in parallel to one another. As another example, without limitation, the solar energy harvesting devices 64 may extend both laterally and towards and away from an intended viewer of the display units 62. As yet another example, without limitation, multiple solar energy harvesting devices 64 may be provided in a fanned array such that some of the solar energy harvesting devices 64 extend in different directions compared to other solar energy harvesting devices 64 for the surface mounted assembly 60. Other orientations may be employed without departing from the scope of the present disclosure.

In exemplary embodiments, the sidewalk assemblies 60 may each comprise an upper portion 65, an electronic display layer portion 63, and a lower portion 61. In exemplary embodiments, the controller 106 may be located in the lower portion 61. In other exemplary embodiments, the controller 106, may be located in the electronic display layer portion 63, such as but not limited to, within a sealed plenum between a front facing and rear facing electronic display layer so that such components may be protected from flooding and/or contaminates in the ambient air. In yet another example, the upper portion 65 may be comprised of material configured to permit radio and/or other signals to enter and exit the upper portion 65. Communication equipment may be placed in the upper portion 65 to further increase the ability to transmit and receive signals. The electrical pathway 102 may extend through one or more of the support members 66 to place in electrical communication one or more components of the surface mounted assembly 60, regardless of which portion 61, 63, 65 they are located in. Accordingly, in one or more examples, the support member 66 may be hollow to accommodate the necessary wiring. Those skilled in the art will appreciate that other locations and configurations for such components may be utilized without departing from the scope of the present disclosure.

Figure 8:
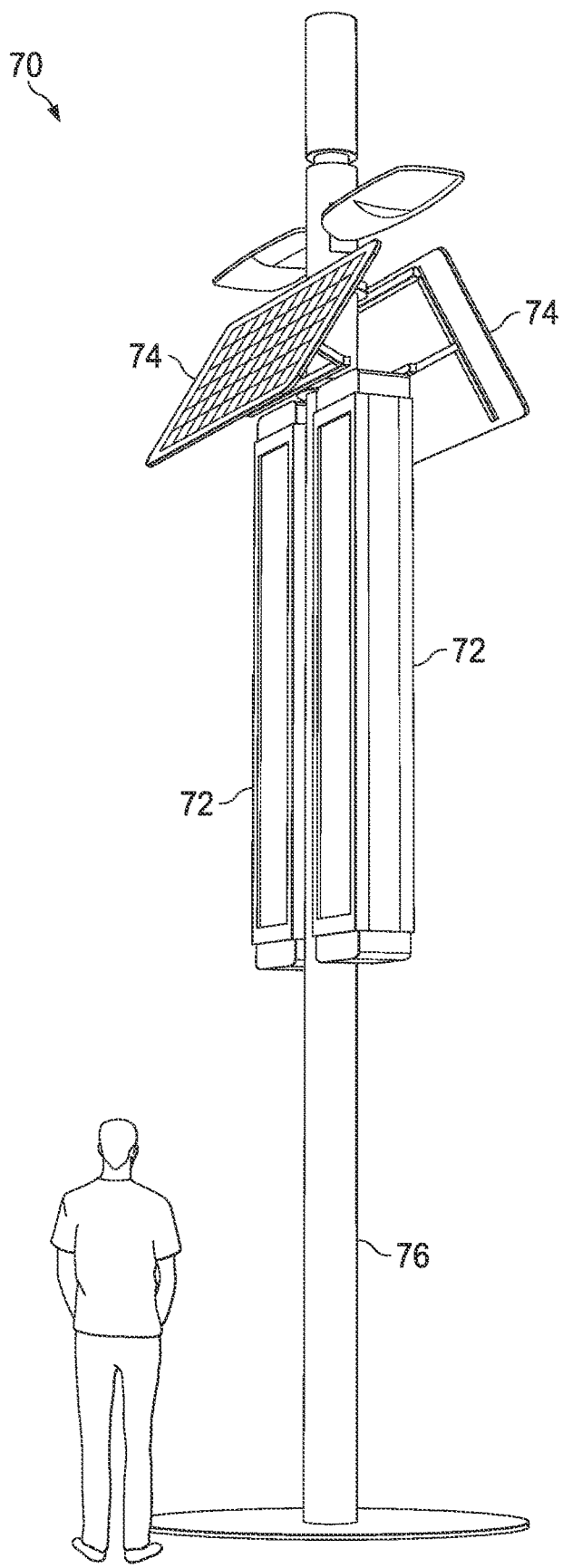
FIG. 8 is a perspective view of an exemplary pole mounted electronic display assembly with solar energy harvesting devices (the "pole mounted assembly")
Figure 9:
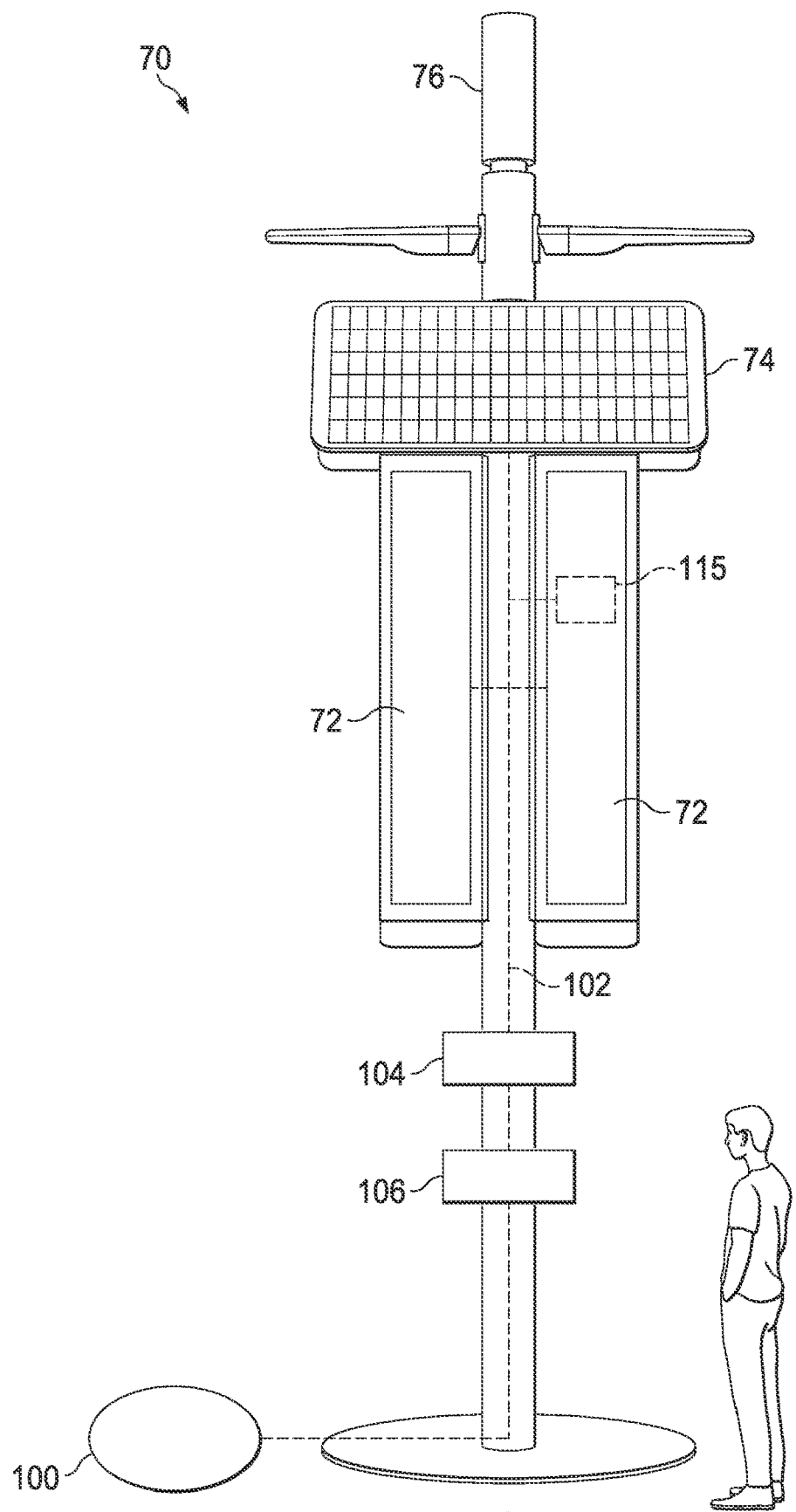
FIG. 9 is a front view of the pole mounted assembly of FIG. 8 with certain internal components revealed and illustrated in simplified form.
Figure 10:
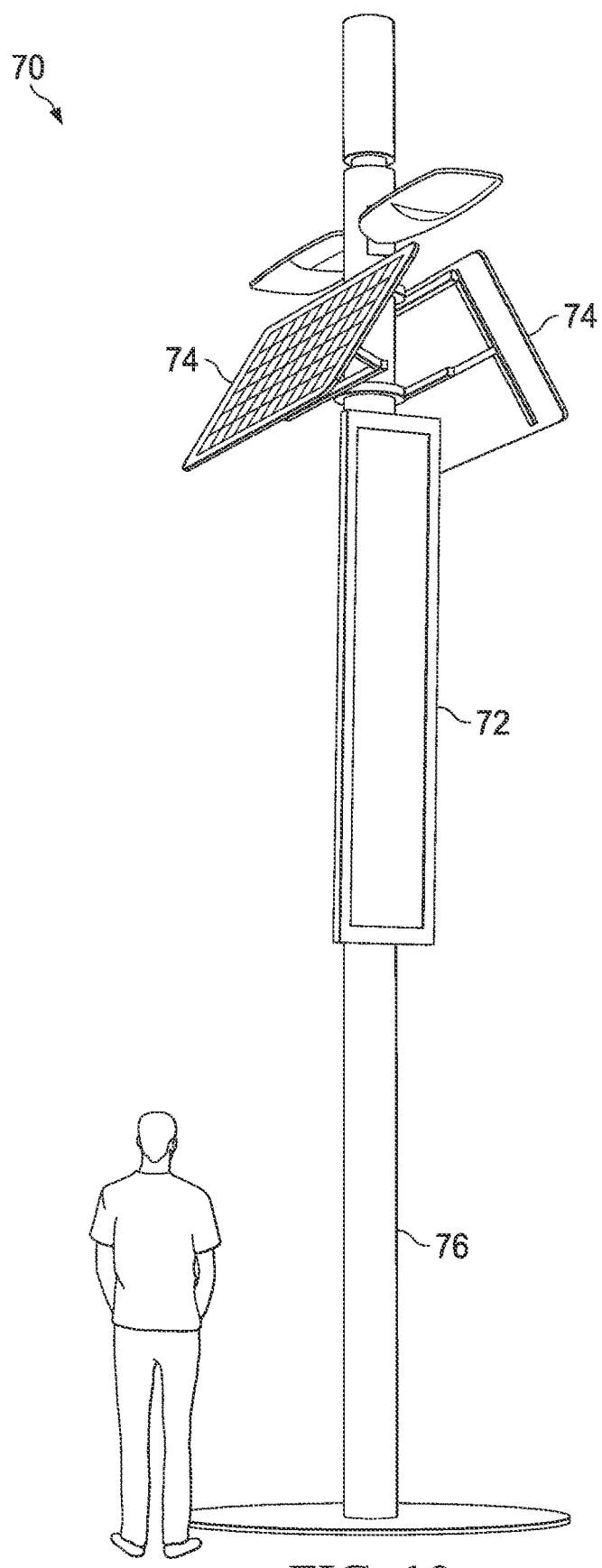
FIG. 10 is a perspective view of another exemplary pole mounted assembly.
Figure 11:
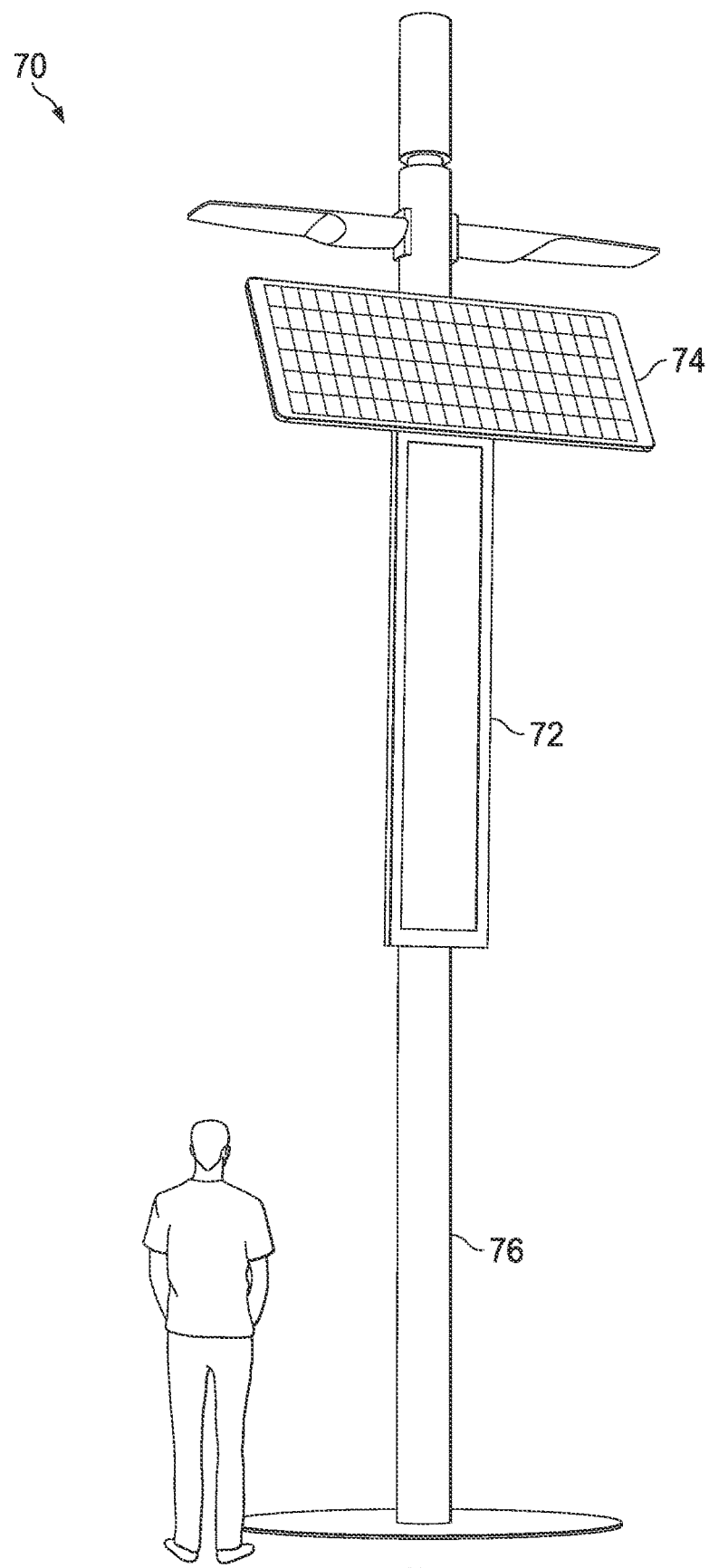
FIG. 11 is a perspective view of another exemplary pole mounted assembly.
Figure 12:
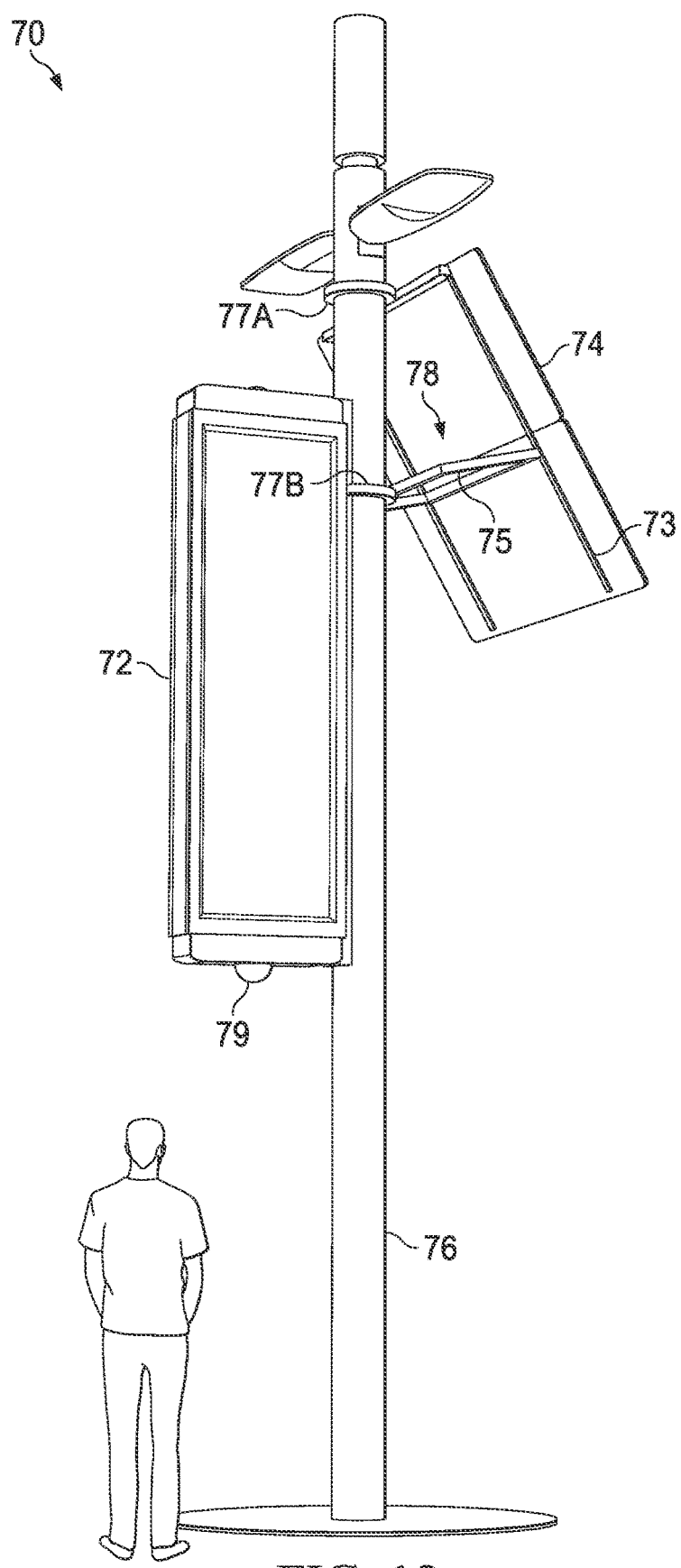
FIG. 12 is a perspective view of another exemplary pole mounted assembly.
Figure 13:
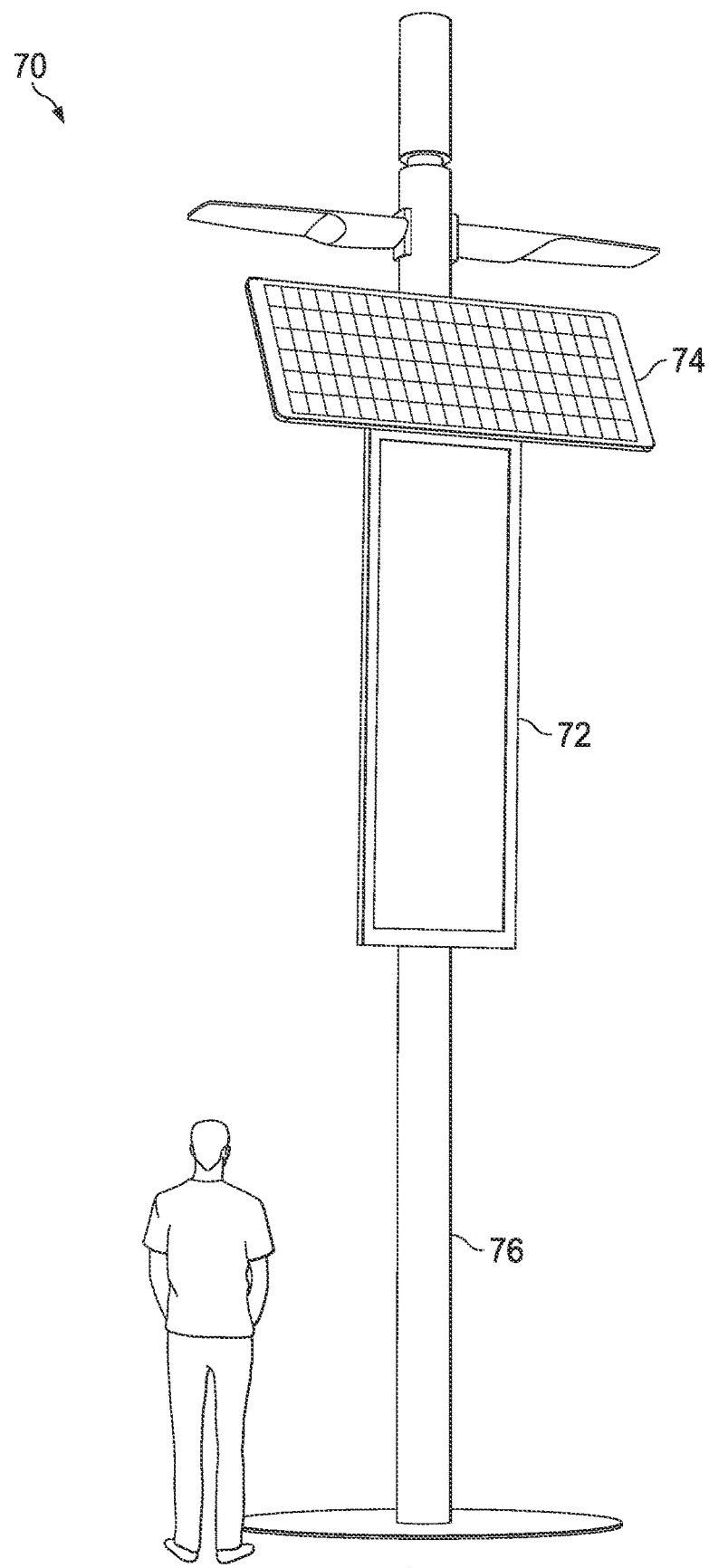
FIG. 13 is a perspective view of another exemplary pole mounted assembly.
Figure 14:
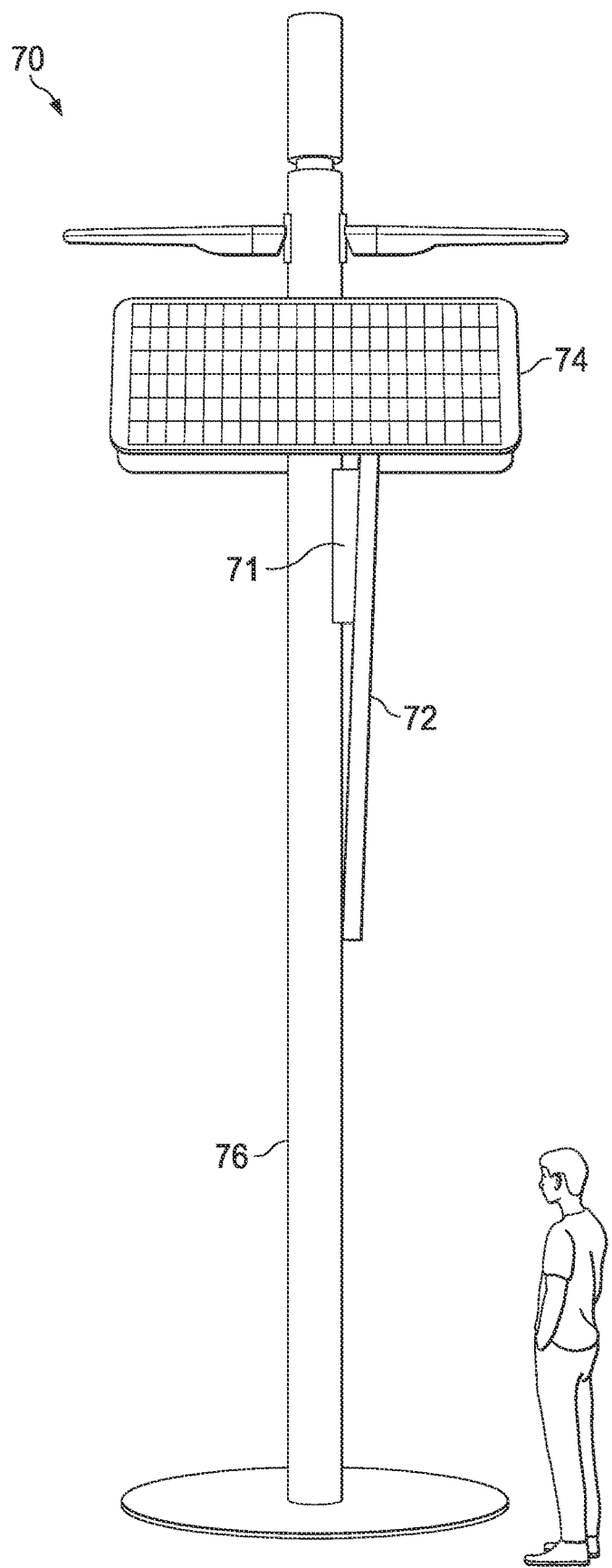
FIG. 14 is a left side view of another exemplary pole mounted assembly.
Figure 15:
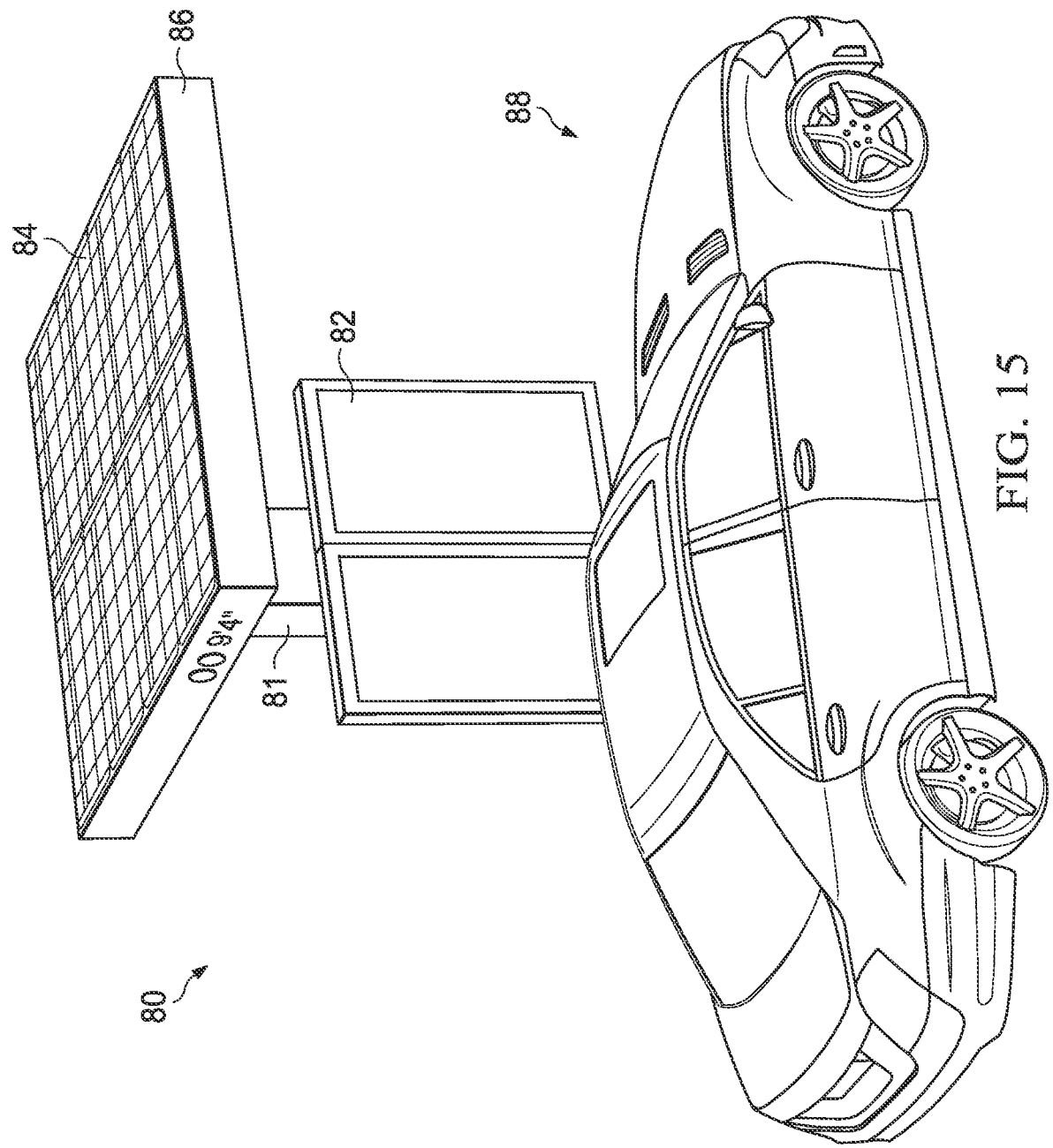
FIG. 15 is a perspective view of an exemplary drive through canopy with an electronic display assembly and solar energy harvesting devices (the "canopy assembly")
Figure 16:
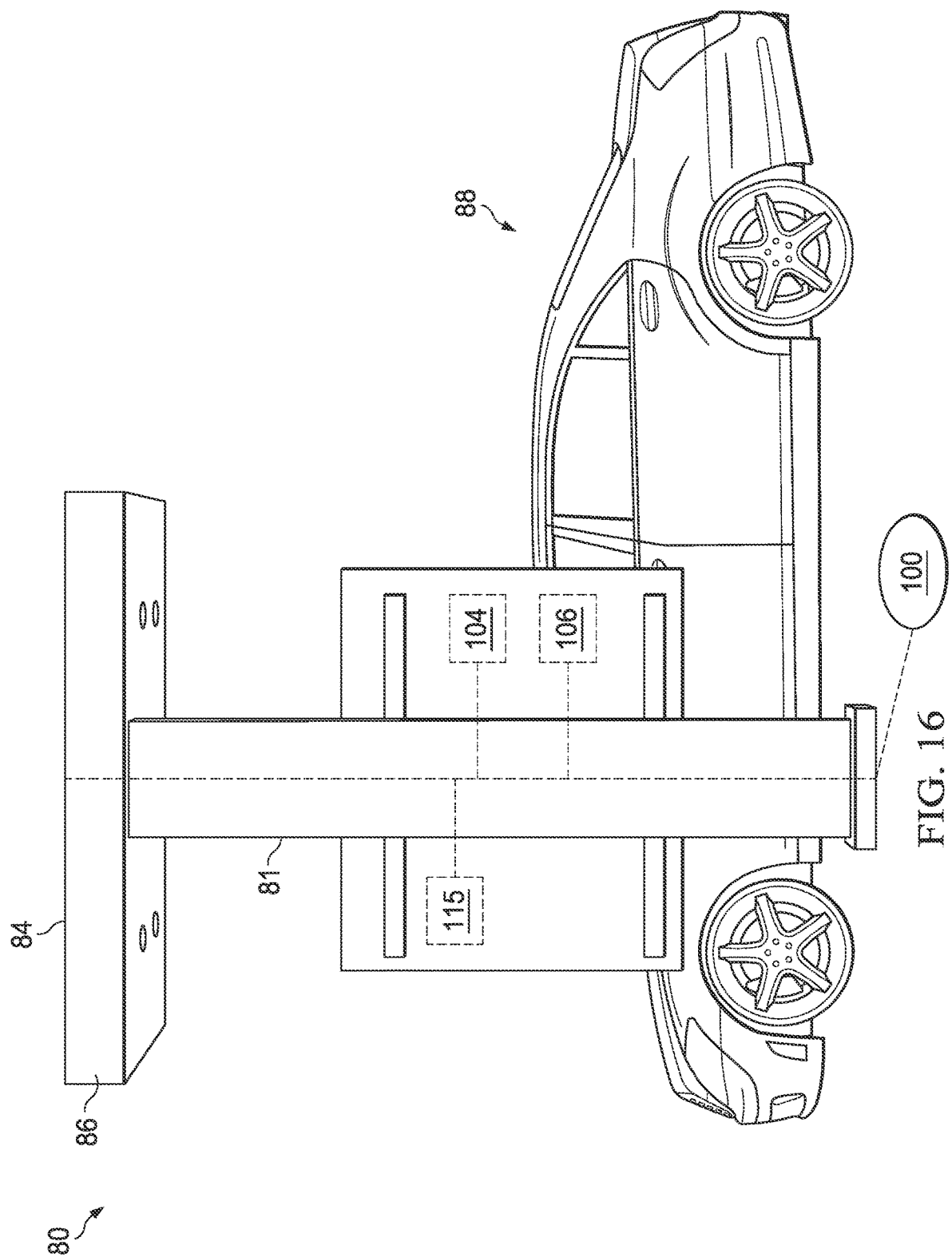
FIG. 16 is a rear view of the canopy assembly of FIG. 15 with certain internal components revealed and illustrated in simplified form.
Figure 17:
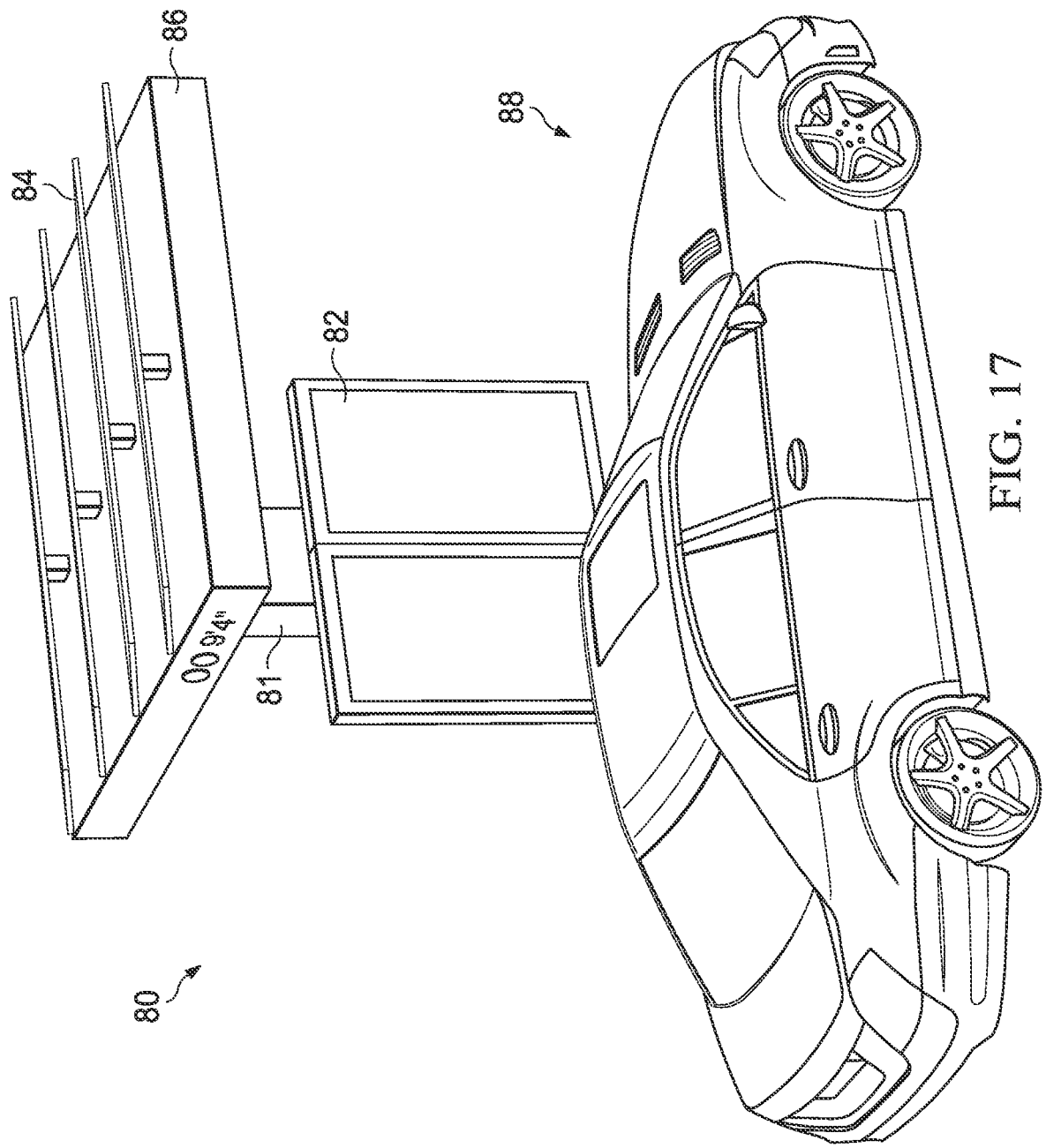
FIG. 17 is a perspective view of the canopy assembly of FIG. 15 with the solar energy harvesting devices in a second position.
Figure 18:
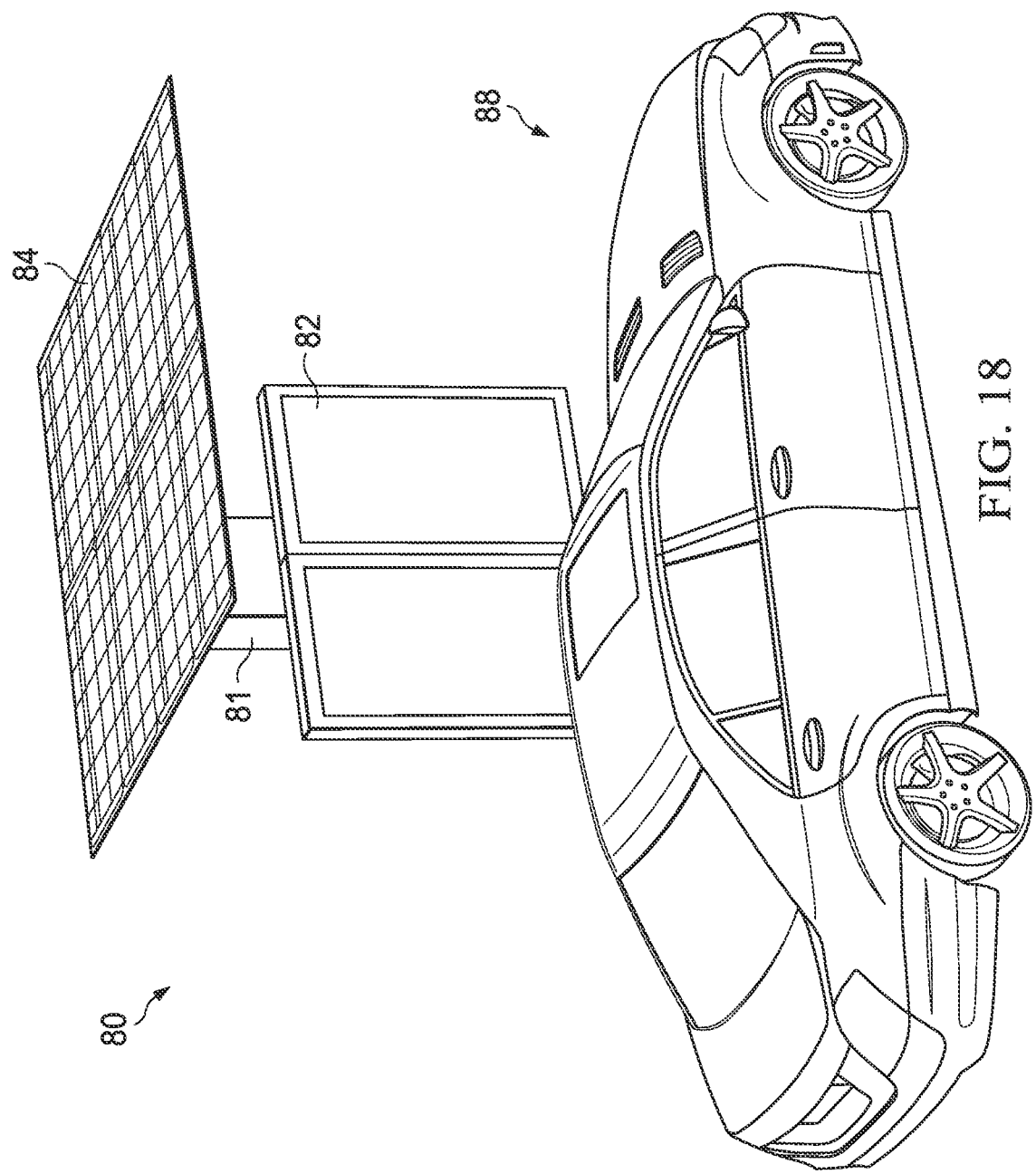
FIG. 18 is a perspective view of another exemplary canopy assembly.

FIG. 8 though FIG. 14 illustrate exemplary pole mounted assemblies 70. The pole mount assemblies 70 may each comprise a pole 76, one or more display units 72, and one or more solar energy gathering devices 74.

The pole 76 may comprise any shape, and may be mounted in any location. For example, without limitation, the pole 76 may be mounted to the ground, a sidewalk, a building, or other structure or surface. The pole 76 may comprise a circular, triangular, rectangular, square, hexagonal, octagonal cross-section, some combination thereof, and/or the like. The pole 76 may comprise a pre-existing pole, having a pre-existing function, that was simply adapted into a pole mounted assembly. The pole 70 may comprise a light pole, a flag pole, a support pole, a column, some combination thereof, and/or the like.

One or more display units 72 may be mounted to the pole 76 in any orientation. For example, without limitation, one, two, three, or four display units 72 may be mounted to the pole 76, and may be evenly spaced around the pole 76, though such is not required. These display units 72 may be similar or different in size and/or shape (e.g., substantially cuboid in shape and/or comprising rounded edges). In exemplary embodiments, the display units 72 may be mounted to the pole 76 in a flag orientation wherein a side surface of the housing for the display units 72 is mounted to the pole 76. If more than one display units 72 are to be mounted, such display units 72 may be mounted parallel to one another on opposing sides of the pole 76. One or more of the display units 72 may alternatively or additionally be flush mounted to the pole 76 wherein a rear surface of the housing for the display units 72 may be mounted to the pole 76. Where more than one display unit 72 is mounted to the pole 76, such display units 72 may be in a back-to-back arrangement on opposing sides of the pole 76. Combinations of flush mounted display units 72 and flag mounted display units 72 may be utilized on a given pole 76. A mounting fixture 71 may extend from each of the display units 72 to the pole 76. In exemplary embodiments, the mounting fixture 71 may be attached to the housing for the display units 72. Alternatively, or additionally, the mounting fixture 71 may be attached to internal structural components of the display units 72 and may extend through the housing for the display units 72. At least one surface of the mounting fixture 71 may be configured to substantially match the shape of the pole 76. For example, without limitation, the mounting fixture 71 may comprise a plate for mounting to a pole 76 having a flat outer surface for mounting to the display unit 72 and a curved inner surface for mounting to a curved pole 76.

The mounting fixture 71 may comprise a collar 77B configured to wrap around some or all of the outer surface of the pole 76. The mounting fixture 71 may alternatively or additionally comprise members, fasteners, nuts, receivers, bolts, screws, nails, adhesive, weld material, straps, some combination thereof, or the like. Attachment of the display units 72 to the pole 76 may be performed by wrapping straps around the pole 76, drilling holes in the pole 76, fastening, bolting, screwing, nailing, welding, bonding, or otherwise attaching the display units 72 to the pole 76. Any type, shape, or size mounting fixture 71 may be utilized. Any type of attachment technique may be utilized.

The display units 72 may comprise one or more peripheral devices 79. Such peripheral devices 79 may include, but is not limited to, network connectivity devices, power modules, microphones, cameras, antenna, ambient light sensors, ambient temperature sensors, air quality monitors, some combination thereof, and/or the like. Such peripheral devices 79 may be provided in a dome, a protrusion, or other structure along an upper, lower, or side surface of the housing for the display units 72.

One or more solar energy harvesting devices 74 may be mounted to the pole 76. Such solar energy harvesting devices 74 may be mounted above the display units 72, though such solar energy harvesting devices 74 may be mounted at any location. In exemplary embodiments, the solar energy harvesting devices 74 may extend at an angle from the pole 76. The solar energy harvesting devices 74 may extend perpendicular to the ground. The support structures 78 may comprise one or more collars 77A, 77B which wrap around the pole 76.

The solar energy harvesting devices 84 may extend from the same or a different side of the pole 76 as the display units 72. An upper and lower edge of the solar energy harvesting devices 74 may extend parallel with an upper and lower edge of the display units 72, though such is not required. The solar energy harvesting devices 74 may be oriented on the pole 76 to cast shade of the display units 72 during some or all of the day.

FIG. 15 through FIG. 18 illustrate exemplary canopy assemblies 80. Canopies 86 of any size or style may be utilized, though it is generally contemplated that canopies 86 may preferably be sized and shaped to extend (e.g., horizontally) over some or all of a vehicle 88 located adjacent to the canopy assembly 80. In this way, the canopy 86 may provide shade to some or all of the display units, as well as to some or all of the vehicle 88, thereby also preventing rain from entering the vehicle 88 when a window of the vehicle is rolled down.

The canopy assemblies 80 may include a vertically extending member 81 which extends from the ground to a position along the canopy 86 (or the solar energy harvesting devices 84, discussed below) where the vertically extending member 81 may securely support the size and weight of the canopy 86 and/or the solar energy harvesting devices 84 (e.g., relatively near the center instead of the periphery of the canopy). Accordingly, it is generally contemplated that the vertically extending member 81 may comprise the necessary strength and/or rigidity required to do so.

One or more display units 82 may be mounted to the canopy assembly 80 or otherwise provided nearby, and may differ in terms of size, arrangement, and composition. In exemplary embodiments, the display units 82 may be mounted to the vertical member 81. The display units 82 may be configured to provide digital menu boards. One or more solar energy harvesting devices 84 may be mounted to the upper portion of the canopy assembly 80. Such solar energy harvesting devices 84 may be mounted flush with an upper surface of the canopy assembly 80. Such solar energy harvesting devices 84 may be mounted at an angle to the upper surface of the canopy assembly 80.

The solar energy harvesting device(s) 84 may be provided either additionally or alternatively to the canopy 86, and may be transparent or translucent. If provided in addition, the solar energy harvesting device(s) 84 may be mounted on top of the canopy 86, or elsewhere. Any suitable orientation may be employed, such as where the solar energy harvesting devices 84 are flush with an upper surface of the canopy assembly 80 and/or where the solar energy harvesting devices 84 are mounted at an angle to the upper surface of the canopy assembly 80. Other orientations and/or combinations of orientations are also contemplated.

Any of the display units 52, 62, 72, 82, may be single sided, double sided, and/or the like. In another example, each of the display units 52, 62, 72, 82 may comprise liquid crystal displays, plasma displays, organic light emitting diode displays, light emitting diode displays, rear projection displays, cathode ray display, some combination thereof, and/or the like. The electronic display(s) within the display units 52, 62, 72, 82 may be provided in any number, size, shape, type, orientation (e.g., landscape or portrait), and/or the like without departing from the scope of the present disclosure. Further, such display units 52, 62, 72, 82 may comprise backlights, such as but not limited to, direct backlights, edge lights, some combination thereof, or the like. Alternatively, or additionally, such display units 52, 62, 72, 82 may also comprise emissive displays. As configured, said display units 52, 62, 72, 82 may be programmed to display any type of information/image/video. In yet another example, each of the display units 52, 62, 72, 82 may alternatively or additionally include poster holders that may include a compartment configured to accommodate signage such as posters, artwork, signage, changeable letter boards, some combination thereof, and/or the like. The compartment may be defined between a transparent cover panel and the electronic display (and/or a poster) within a display unit housing. The poster holders may further include an illumination device for illuminating the signage deposited therein.

The display units 52, 62, 72, 82 may be substantially rectangular in shape, though any size and shape may be utilized. The display units 52, 62, 72, 82 may comprise one or more cooling pathways. Such cooling pathways may comprise openings configured to ingest and exhaust ambient air and move such ambient air though open loop pathways. In exemplary embodiments, such open loop pathways may extend along backlights for the display units 52, 62, 72, 82. Such cooling pathways may include, additionally or alternatively, closed loop pathways located entirely within the display units 52, 62, 72, 82 for circulating gas. In exemplary embodiments, the closed loop pathways may encircle the electronic displays of the display units 52, 62, 72, 82 by passing the circulating gas through a gap between the transparent cover panel and the electronic display surface. One or more electronic components for operating the display units 52, 62, 72, 82 may be provided within, along, or adjacent to the closed loop pathways. Such electronic components may comprise the peripheral devices 79, video players, power supplies, controllers, network connectivity devices, antenna, computers, some combination thereof, or the like. One or more fans may be provided within or along the open loop pathways to force ambient air therethrough. One or more fans may be provided within or along the closed loop pathways to force circulating gas therethrough. A heat exchanger may be provided, preferably behind one or more of the display units 52, 62, 72, 82 to permit heat transfer between the relatively warm circulating gas in the closed loop pathway and the relatively cool ambient air in the open loop pathway.

Any of the solar energy harvesting devices 24, 54, 64, 74, and 84 may utilize opaque, transparent, and/or translucent panels, and may be provided in any size, shape, orientation (e.g., flush or mounted at an angle), number, type, and/or the like. These solar energy harvesting devices 24, 54, 64, 74, and 84 may comprise any number of photovoltaic cells. Some or all of the solar energy harvesting devices 24, 54, 64, 74, and 84 may be configured to swivel, pivot, tilt, rotate, some combination thereof, or the like. Such movement may be accomplished manually or automatically, such as by motor and controller configured to track the sun's movement.

While the solar energy harvesting devices 24, 54, 64, 74, and 84 may be shown or described herein as being mounted on, or otherwise associated with, various structures, such as but not limited to, the bus shelter assembly 50, the surface mounted assembly 60, the pole mounted assemblies 70, and the canopy assemblies 80, some or all of such solar energy harvesting devices 24, 54, 64, 74, and 84 may, alternatively or additionally, be positioned elsewhere such as, without limitation, on the adjacent ground, on a nearby structure (e.g., roof or pole), some combination thereof, or the like. This may permit improved position for efficient collection of solar energy as well as the ability to use an expanded surface area for powering the units.

Figure 19:
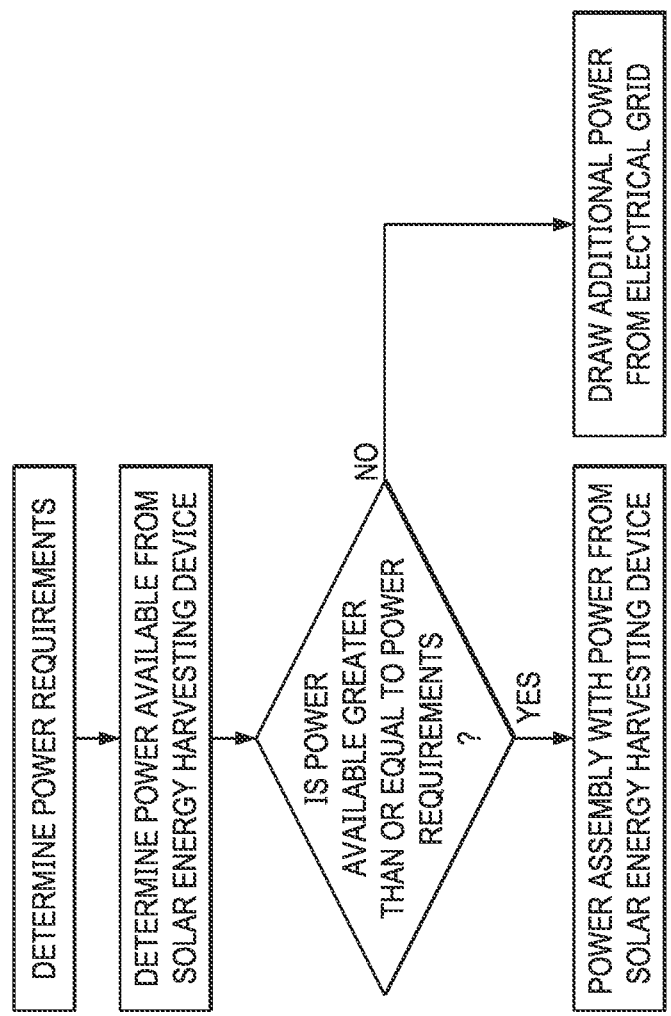
FIG. 19 is a flow chart with exemplary logic for operating the assemblies of FIGS. 1-18 and 20-24.

FIG. 19 provides a flowchart with exemplary logic for operating the various assemblies 50, 60, 70, 80 and related components. The controller 106 may determine the amount of power needed to operate the assembly 50, 60, 70, 80. This determination may be performed by the controller 106 and may be based, at least in part, on readings from the sensors 115, operational data from the assemblies 50, 60, 70, 80, historical information, predictions, some combination thereof, or the like. The amount of electrical energy collected by the solar energy harvesting device 54, 64, 74, 84 may be determined. The solar energy harvesting devices 54, 64, 74, 84 may be located at least 9.5 ft above the ground surface, though any height may be utilized. The controller 106 may be configured to determine if the energy collected is greater than or equal to the power needed. If yes, the controller 106 may be configured to power the assembly 50, 60, 70, 80 only with the power collected by the solar energy harvesting device 54, 64, 74, 84. If no, the controller 106 may be configured to draw all available energy from the solar energy harvesting devices 54, 64, 74, 84 and draw supplemental power from the electrical grid 100 sufficient to power the assembly 50, 60, 70, 80.

In one non-limiting example, power generated by the solar energy harvesting devices 54, 64, 74, 84 may be used to power the display units 52, 62, 72, 82 when conditions are sufficiently sunny. In this example, the power generated by the solar energy harvesting devices 54, 64, 74, 84 may be greater than or equal to the power needed to operate the assembly. If there is excess energy, that energy may be transmitted back into the electrical grid 100.

In another non-limiting example, the power generated by the solar energy harvesting devices 54, 64, 74, 84 may be insufficient to operate the display units 52, 62, 72, 82. This may occur, for example, when the solar energy harvesting devices is not receiving enough solar energy (e.g., too cloudy, obstructions blocking sunlight, debris on the solar energy harvesting devices, etc.). In which case, the assemblies 50, 60, 70, 80 may draw energy from the electrical grid 100, but preferably only to the extent it is needed to compensate for the insufficient amount of energy generated by the solar energy harvesting devices 54, 64, 74, 84.

For example, without limitation, power generated by the solar energy harvesting devices 54, 64, 74, 84 may be used to power the display units 52, 62, 72, 82 when conditions are sufficiently sunny. Excess energy, if any, may be transmitted back into the electrical grid 100, though such is not required.

The use of energy collected by the solar energy harvesting devices 54, 64, 74, 84 may reduce the environmental impact of the assemblies 50, 60, 70, 80 by reducing the degree to which said assemblies rely on the electrical grid 100. The use of such solar energy harvesting devices 54, 64, 74, 84 may serve as a more environmentally sustainable, alternative energy source. The display units 52, 62, 72, 82 may be periodically, or continuously, powered by the solar energy harvesting device 54, 64, 74, 84. Alternatively, or additionally, the assemblies 50, 60, 70, 80 may generate revenue by placing electricity back into the electrical grid 100.

Bulk energy storage devices 104, such as batteries, super capacitors, ultra-capacitors, and the like, are commonly used to store energy. The solar energy harvesting devices 54, 64, 74, 84 may store energy in the bulk energy storage devices 104 when the solar energy harvesting devices 54, 64, 74, 84 are generating a surplus of energy (e.g., such as when it is sunny). Then, when the energy generated by the solar energy harvesting devices 54, 64, 74, 84 starts to diminish (e.g., such as when it is dark), stored energy within the bulk energy storage devices 104 may be used to provide power.

In exemplary embodiments of the assemblies, however, no bulk energy storage devices 104 are used. Such bulk energy devices 104 can be seen as a liability as they, for example without limitation, may comprise flammable materials, may require rare earth materials, may take up physical space within the assembly, may require periodic replacement, to name a few examples, without limitation. Because the assemblies 50, 60, 70, 80 of the present disclosure are capable of drawing supplemental energy from the electrical grid 100, in exemplary embodiments, such bulk energy storage devices 104 are not required.

In exemplary embodiments, no AC-DC converters are required. For example, without limitation, the display units 52, 62, 72, 82 may be configured to directly accept both AC and DC power, though such is not required. In exemplary embodiments, the display units 52, 62, 72, 82 may be configured to directly accept DC power generated by the solar energy harvesting devices 54, 64, 74, 84, and the display units 52, 62, 72, 82 may be configured to directly accept AC power generated by the electrical grid 100.

Figure 20:
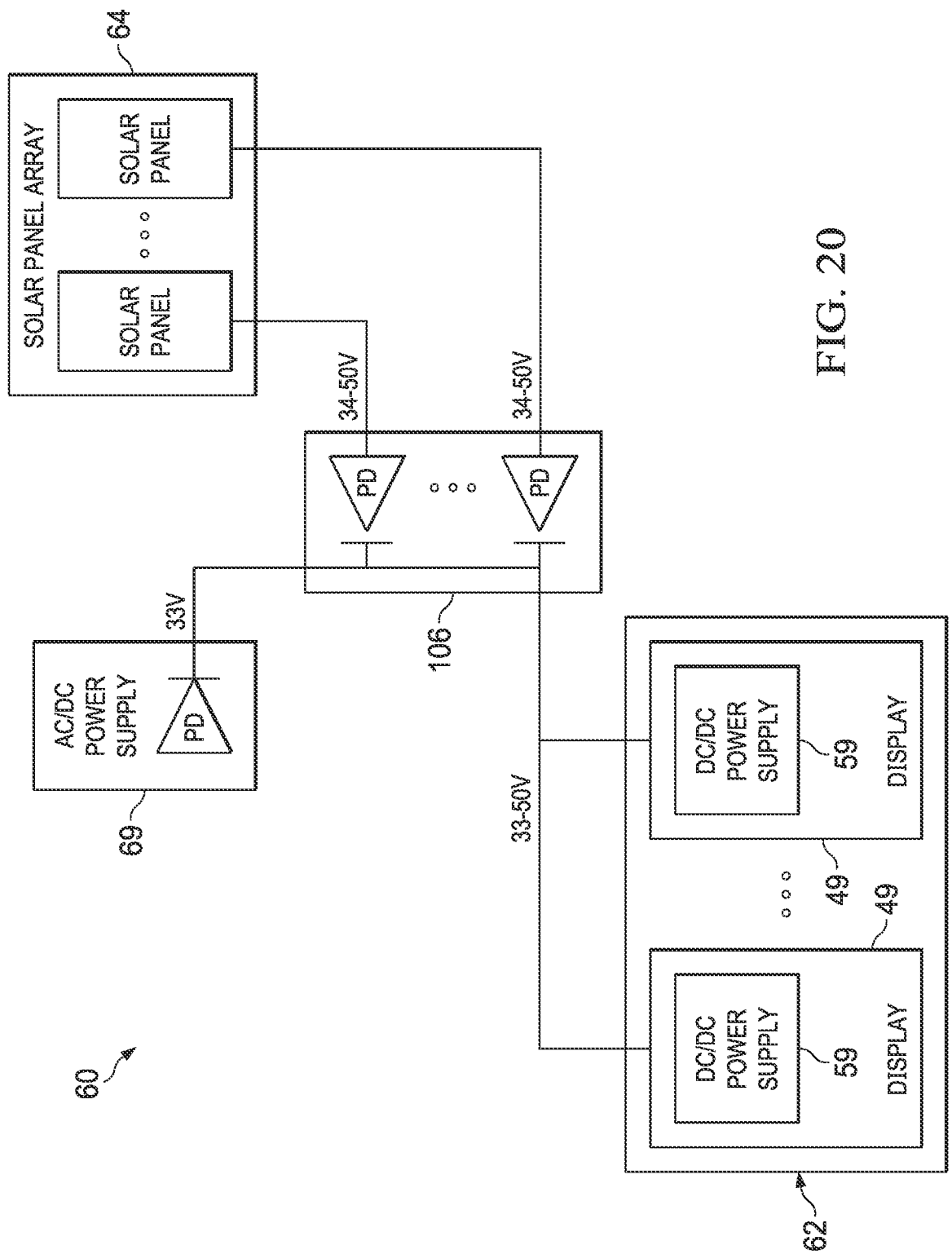
FIG. 20 is a simplified electrical schematic diagram in accordance with the present invention.

FIG. 20 illustrates a schematic illustration of an exemplary embodiment of an assembly 60. The assembly 60 may comprise a solar panel array 64 having two or more solar panels. The assembly 60 may comprise two or more electronic displays 49. The assembly 60 may comprise a DC/DC power supply 59 for each electronic display 49. The assembly 50 may comprise an AC/DC power supply 69. A controller 106 may be placed in electronic communication with the AC/DC power supply 69, the solar panel array 64, and the display unit 62. The AC/DC power supply 69 in exemplary embodiments, without limitation, may comprise the electrical grid 100. In operation, the solar panel array may supply power to the controller 106 (e.g., 34-50 volts) via a perfect diode (or an ideal diode). The controller 106 may then direct this power to the AC/DC power supply (e.g., 33 volts) via another perfect diode, and/or also to the DC/DC power supplies within the displays (e.g., 33-50 volts).

While certain references are made herein with regards to the assembly 60 and display unit 62, the same or similar arrangement may be utilized with regard to the various assemblies 50, 60, 70, 80 and related components.

Figure 21:
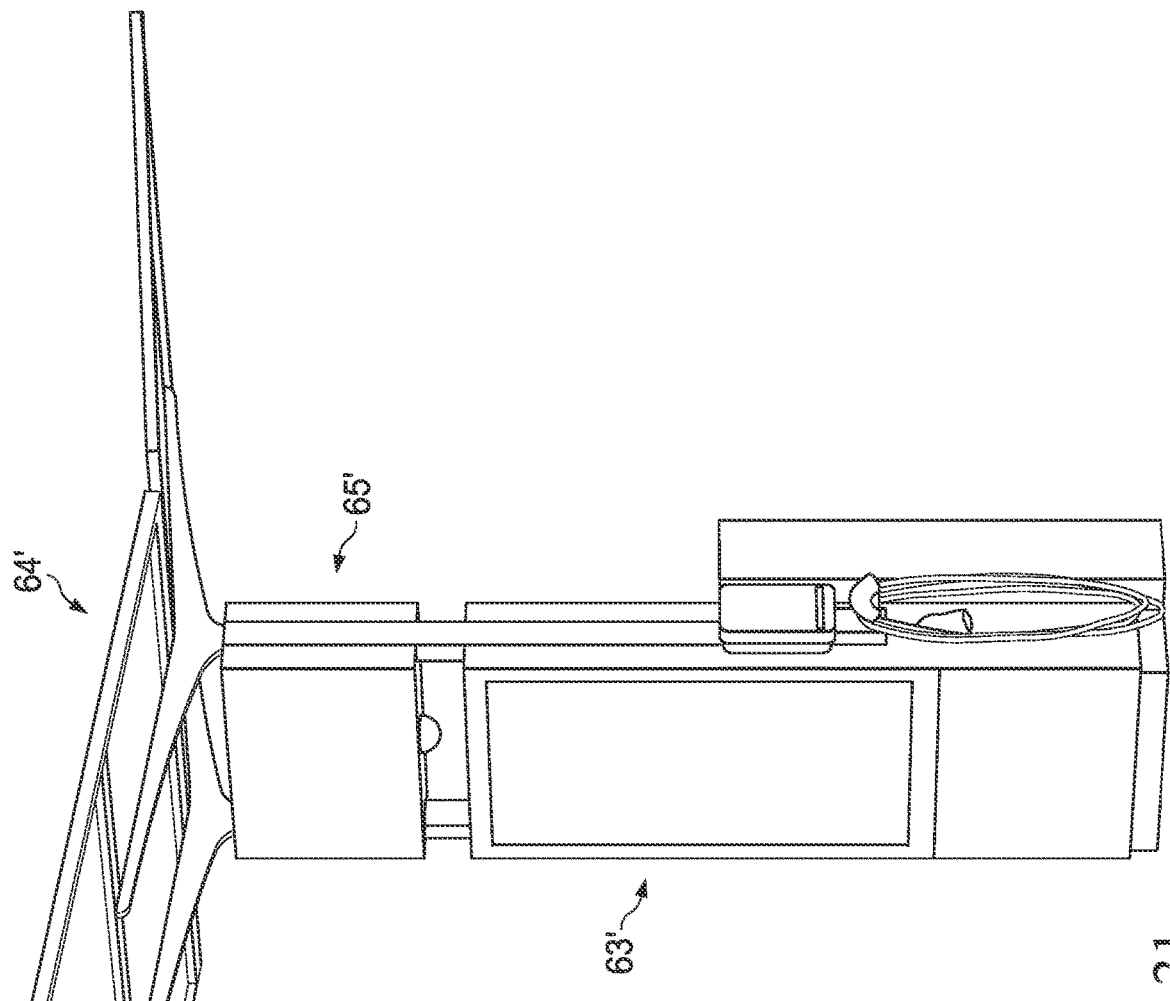
FIG. 21 is a perspective view of another exemplary surface mounted assembly with solar energy harvesting devices.

FIG. 21 illustrates another exemplary surface mounted assembly 60'. The surface mounted assembly 60' may be similar to, and/or may comprise some or all of the same components as the surface mounted assembly 60. The surface mounted assembly 60' may comprise one or more solar energy harvesting devices 64'. The solar energy harvesting devices 64' may be the same, or similar to, the solar energy harvesting devices 64 previously shown and/or described herein. In exemplary embodiments, the solar energy harvesting devices 64' may comprise multiple solar panels mounted at an angle to one another, such as but not limited forming a "V" shape. The surface mounted assembly 60' may comprise an upper portion 65' which may be the same or similar to the upper portion 65, though such is not required. The surface mounted assembly 60' may comprise a display layer portion 63' which may be the same or similar to the display layer portion 63, though such is not required.

Figure 22:
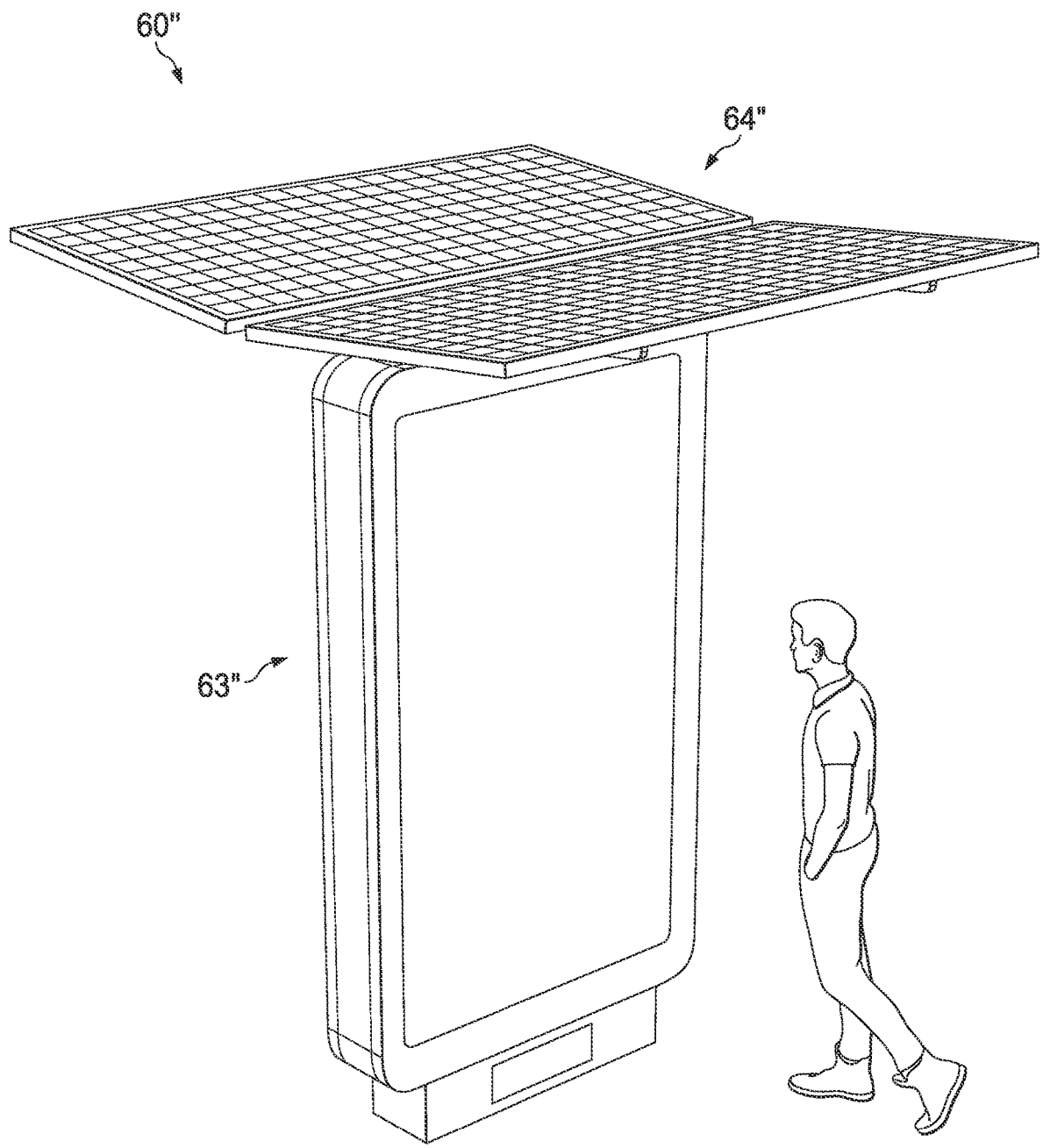
FIG. 22 is a top perspective view of another exemplary surface mounted assembly with solar energy harvesting devices.

FIG. 22 illustrates another exemplary surface mounted assembly 60". The surface mounted assembly 60" may be similar to, and/or may comprise some or all of the same components as the surface mounted assembly 60 and/or 60'. The surface mounted assembly 60" may comprise one or more solar energy harvesting devices 64". The solar energy harvesting devices 64" may be the same, or similar to, the solar energy harvesting devices 64 and/or 64' previously shown and/or described herein. In exemplary embodiments, the solar energy harvesting devices 64" may comprise multiple solar panels mounted at an angle to one another, such as but not limited to, forming a "V" shape. The surface mounted assembly 60" may comprise a display layer portion 63" which may be the same or similar to the display layer portion 63, though such is not required.

Figure 23:
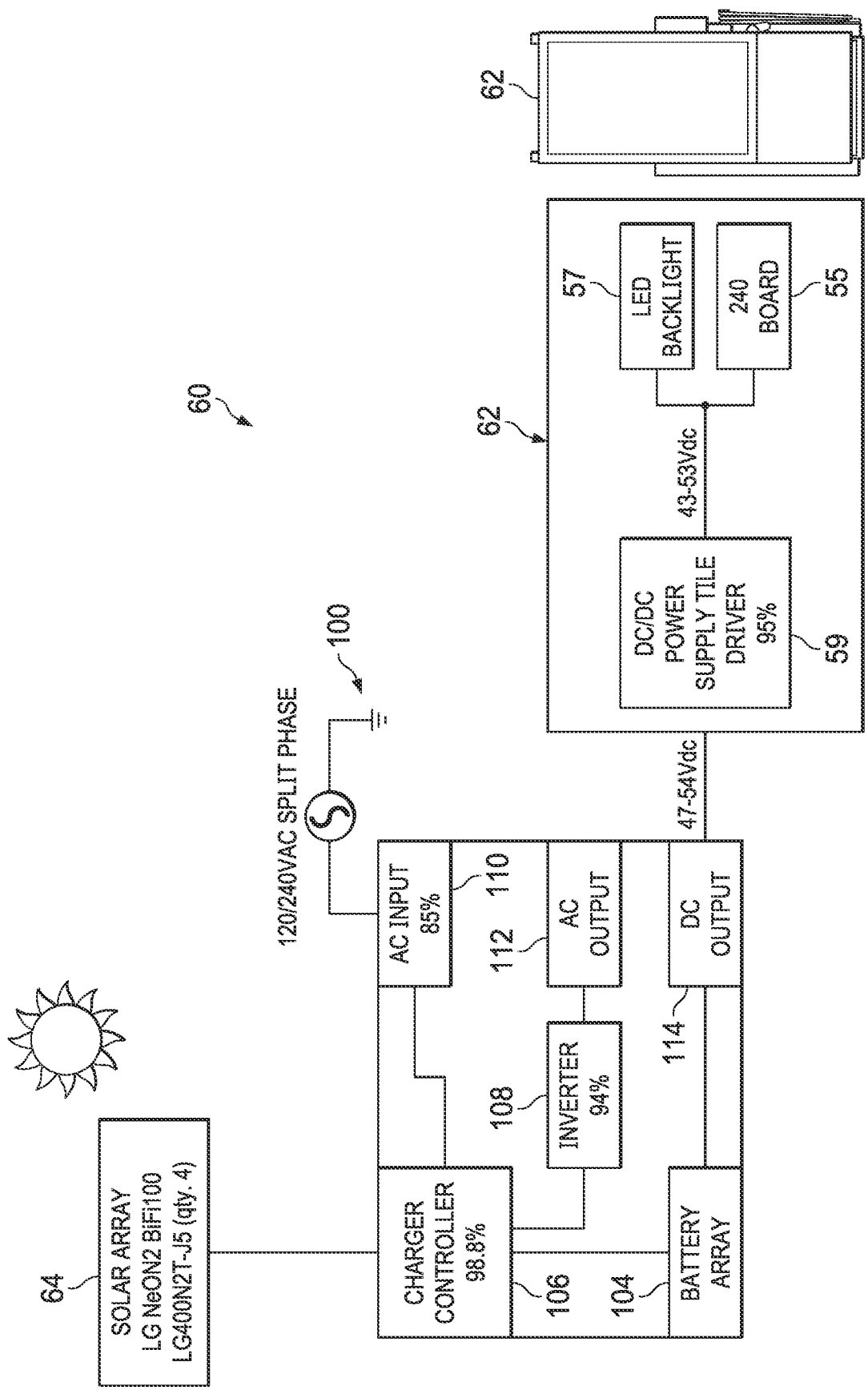
FIG. 23 is an exemplary electrical schematic diagram for use with the systems and methods of FIGS. 1-22.

FIG. 23 is an exemplary electrical schematic. The solar energy harvesting devices 64 may be placed in electrical connection with the controller 106. The controller 106 may be in electrical connection with the utility power supply 100, such as but not limited to, by way of an AC input 110. An inverter 108 may be electrically interposed between the AC input 110 and an AC output 112 to convert AC power to DC power as required. The controller 106 may be electrically connected to one or more energy storage devices 104 for storing excess energy and disbursing such excess energy as instructed by the controller 106. The energy storage devices 104 may be in electrical connection with an DC output 114.

The DC output 114 may be placed in electrical connection with one or more display units 62. The DC power may be received at a DC/DC power supply 59. The DC/DC power supply 59 may distribute DC power to backlights 57 and/or various electrical components 55 of the display unit 62, the display layer portion 63, and/or other various components of the assembly 60, such as but not limited to, sensors, fans, cooling device, customer equipment, electronics, combination thereof, or the like.

While certain references are made herein with regards to the assembly 60 and display unit 62, the same or similar arrangement may be utilized with regard to the various assemblies 50, 60, 60', 60", 70, 80 and related components.

Exemplary electrical efficiencies are provided at FIG. 23 by way of a non-limiting example to demonstrate the increase in efficiency realized by utilizing a DC/DC system. Such efficiencies may be based on simulated weather conditions based on historical weather and other environmental considerations for a given location.

Figure 24:
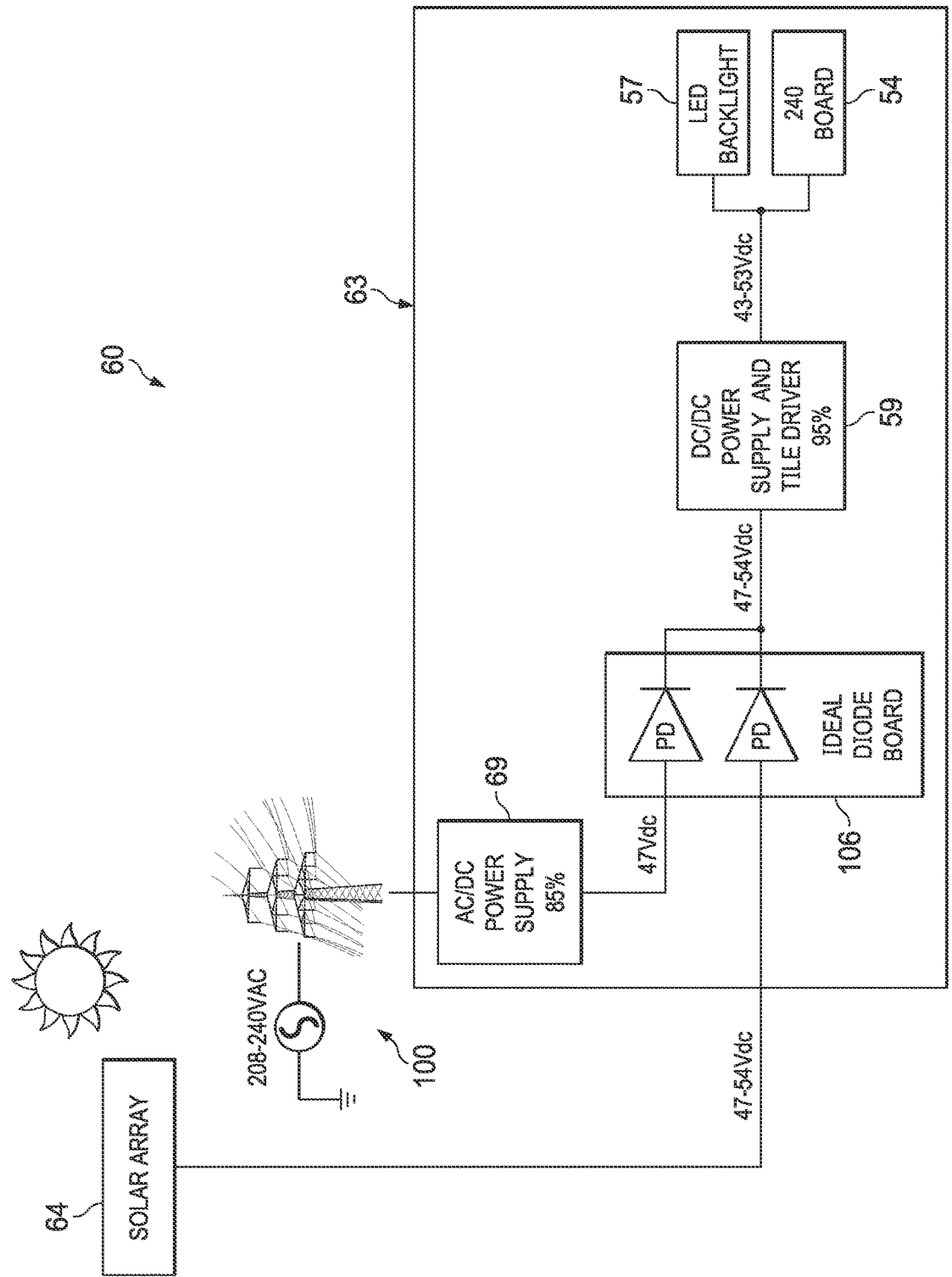
FIG. 24 is another exemplary electrical schematic diagram for use with the systems and methods of FIGS. 1-22.

FIG. 24 is another exemplary electrical schematic. The solar energy harvesting devices 64 may be placed in electrical connection with the controller 106. The controller 106 may be in electrical connection with the utility power supply 100, such as but not limited to, by way of an AC/DC power supply 69. The AC/DC power supply 69, in exemplary embodiments, may comprise one or more inverters 108 for converting AC energy from the utility power supply 100 to DC power as required. The controller 106 may be electrically connected to a DC/DC power supply 59. The DC/DC power supply 59 may distribute DC power to backlights 57 and/or various electrical components 55 of the display layer portion 63 and/or other various components of the assembly 60, such as but not limited to, the display unit 62, sensors, fans, cooling device, customer equipment, electronics, combination thereof, or the like.

While certain references are made herein with regards to the assembly 60 and display layer portion 63, the same or similar arrangement may be utilized with regard to the various assemblies 50, 60, 60', 60", 70, 80 and related components.

Exemplary electrical efficiencies are provided at FIG. 24 by way of non-limiting example to demonstrate the increase in efficiency realized by utilizing a DC/DC system. Such efficiencies may be based on simulated weather conditions based on historical weather and other environmental considerations for a given location.

FIG. 25 through FIG. 29 illustrate other exemplary embodiments of a surface mounted assembly 160. The surface mounted assembly 160 may be similar to, and/or may comprise some or all of the same components as the surface mounted assemblies 60, 60' and/or 60". Similar components may be numbered similarly and increased by 100 (e.g., 60, 60', or 60" to 160). An electronic display portion 163 may be located between a solar energy harvesting portion 164 and a bulk energy storage portion 104.

The electronic display portion 163 may comprise one or more electronic displays placed within one or more housings. In exemplary embodiments, each of the electronic display portions 163 comprise one or more open and/or closed loop airflow pathways for ambient air and/or circulating gas. For example, without limitation, the electronic display portion 163 may comprise a single electronic display or two electronic displays arranged back-to-back. Such electronic displays may be provided in a common housing, or in separate housings. A single or multiple open loop airflow pathways for ambient air may extend within the housing(s), such as behind the electronic display or between multiple electronic displays. A single or multiple closed loop airflow pathway(s) for circulating gas may extend within the housing(s), such as around each of the electronic displays. The open and/or closed loop airflow pathways may be separate or shared.

Alternatively, or additionally, other thermal management equipment may be provided at such electronic display portions 163 including, but not limited to, fans, air conditioners, heaters, heat exchangers, fins or surface features, thermocouples, heat pipes, thermal plates, combinations thereof, or the like. Equipment for operating the electronic displays may be provided such as, but not limited to, electronic storage devices, video players, controllers, network communication devices, processors, combinations thereof, or the like. The electronic display(s) of the electronic display portion 163 may be any type or kind of electronic display, such as but not limited to, LCD, LED, plasma, rear projector, cathode ray tube, combinations thereof, or the like.

The bulk energy storage portion 104 may comprise one or more housings for one or more batteries. The bulk energy storage portion 104 may be configured for placement between, or attachment to, various items of street furniture, such as but not limited to, waste disposal containers 105. In other exemplary embodiments, the bulk energy storage portion 104 may be freestanding. Open loop airflow pathways, closed loop airflow pathways, and/or other thermal management equipment (e.g., fans, air conditioners, heaters, heat exchangers, fins or surface features, thermocouples, heat pipes, thermal plates) may be provided at the bulk energy storage portion 104 to assist with thermally managing the same. In some exemplary embodiments, certain of said open and/or closed loop airflow pathways may be connected to those of the electronic display portion 163, though such is not required.

Figure 25:
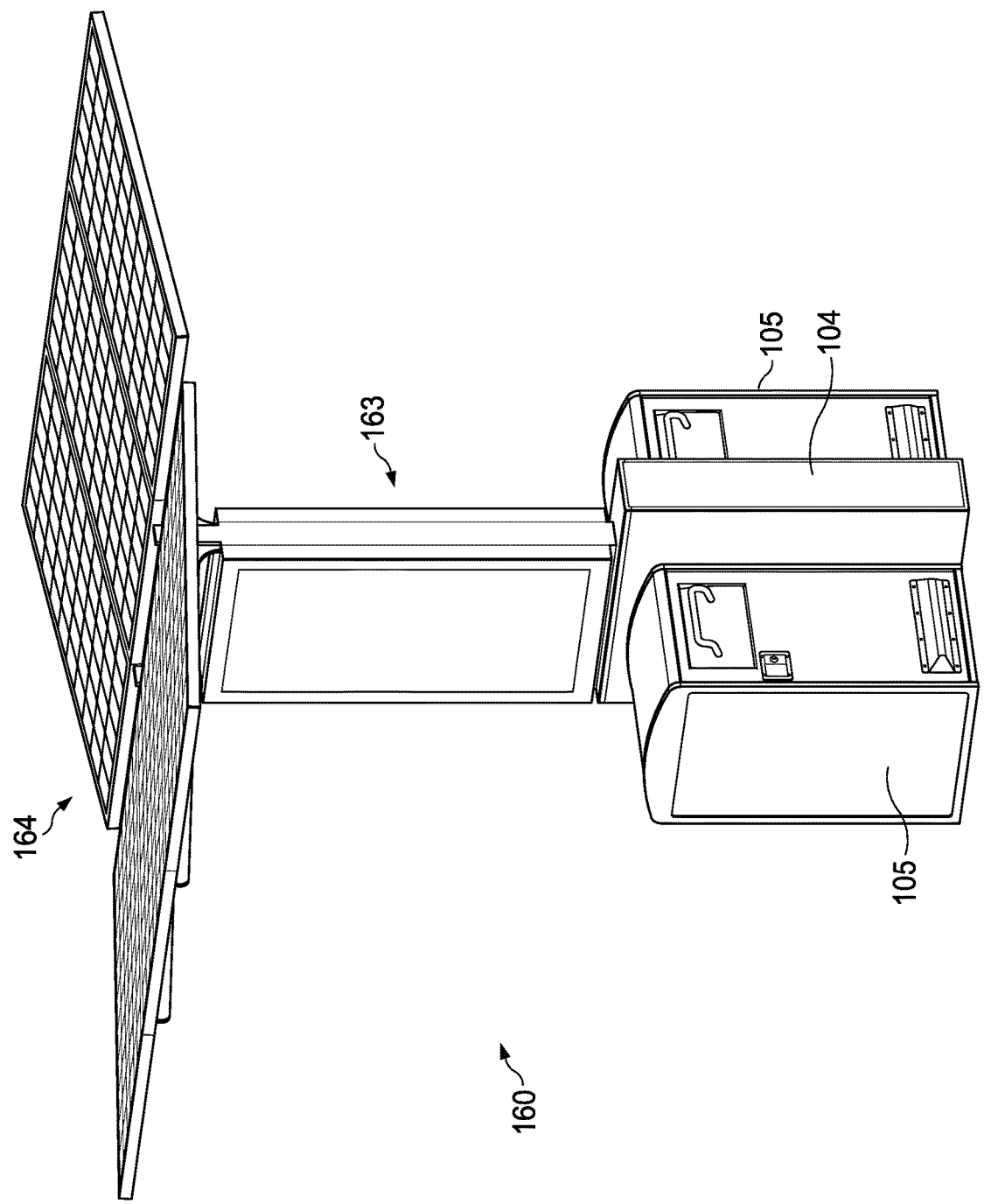
FIG. 25 is a perspective view of another exemplary surface mounted assembly with an integrated solar energy harvesting device and bulk energy storage device.
Figure 26:
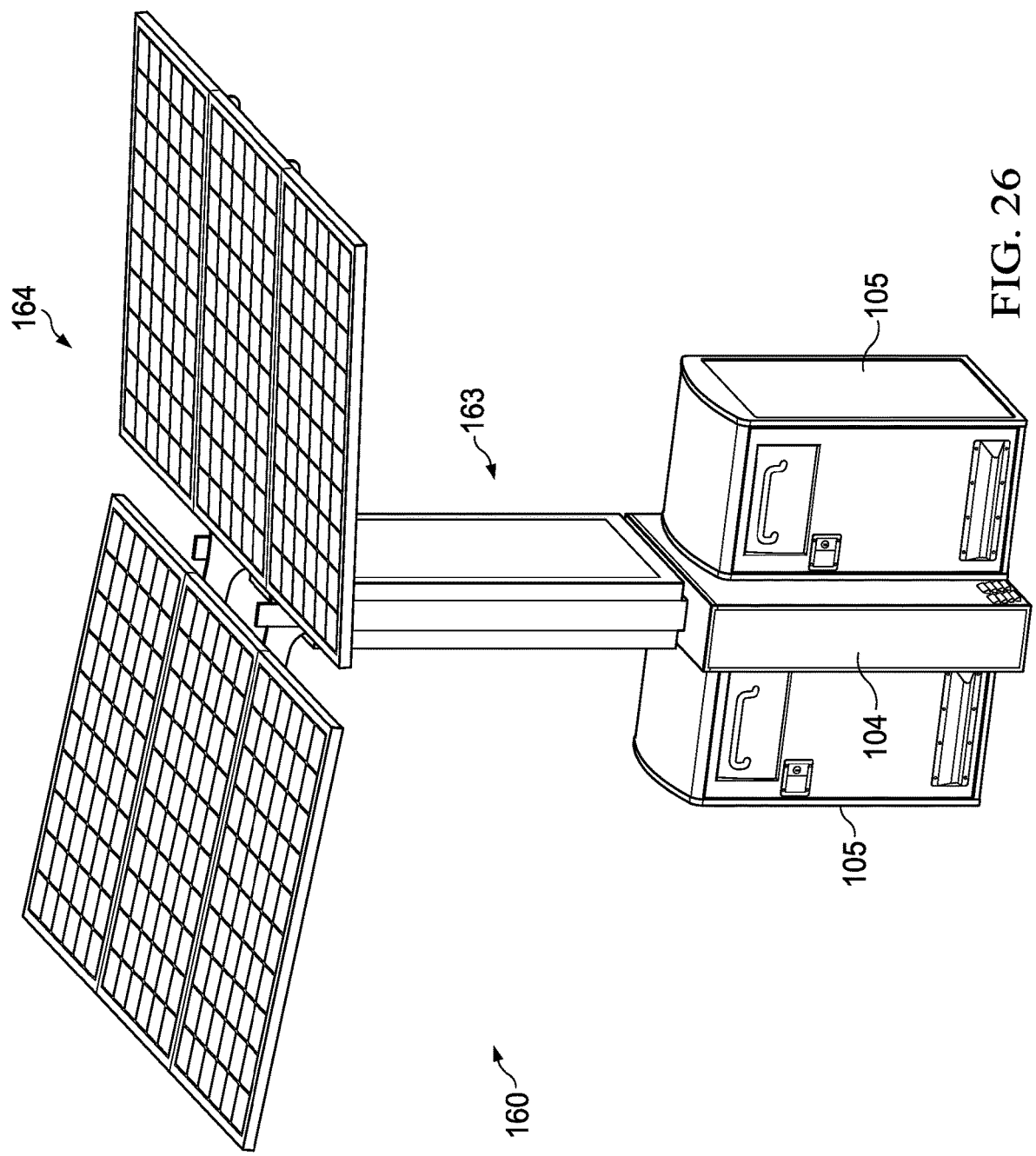
FIG. 26 is another perspective view of the device of FIG. 25.
Figure 27:
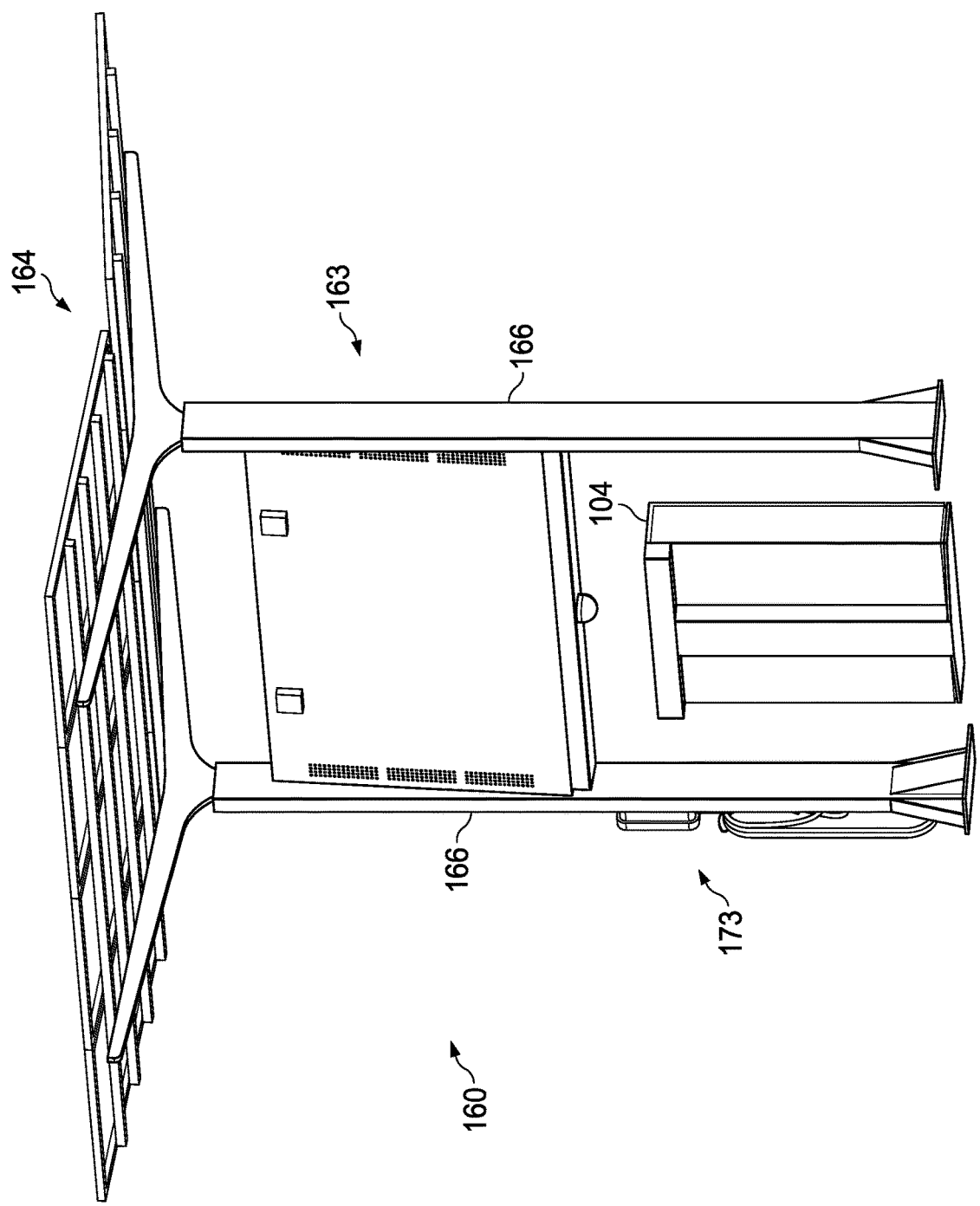
FIG. 27 a perspective view of another exemplary surface mounted assembly with integrated charging equipment.
Figure 28:
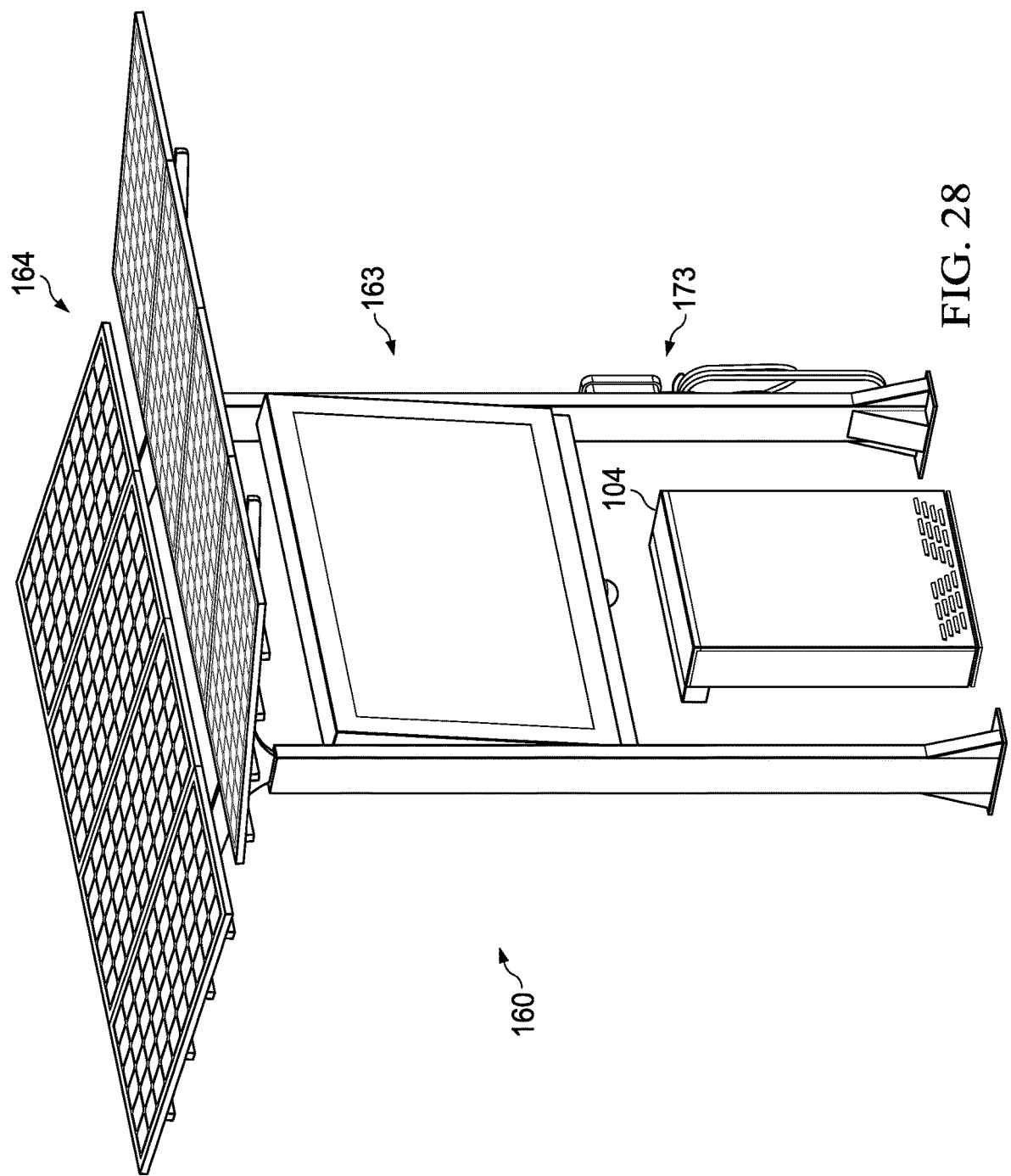
FIG. 28 is another perspective view of the device of FIG. 27.
Figure 29:
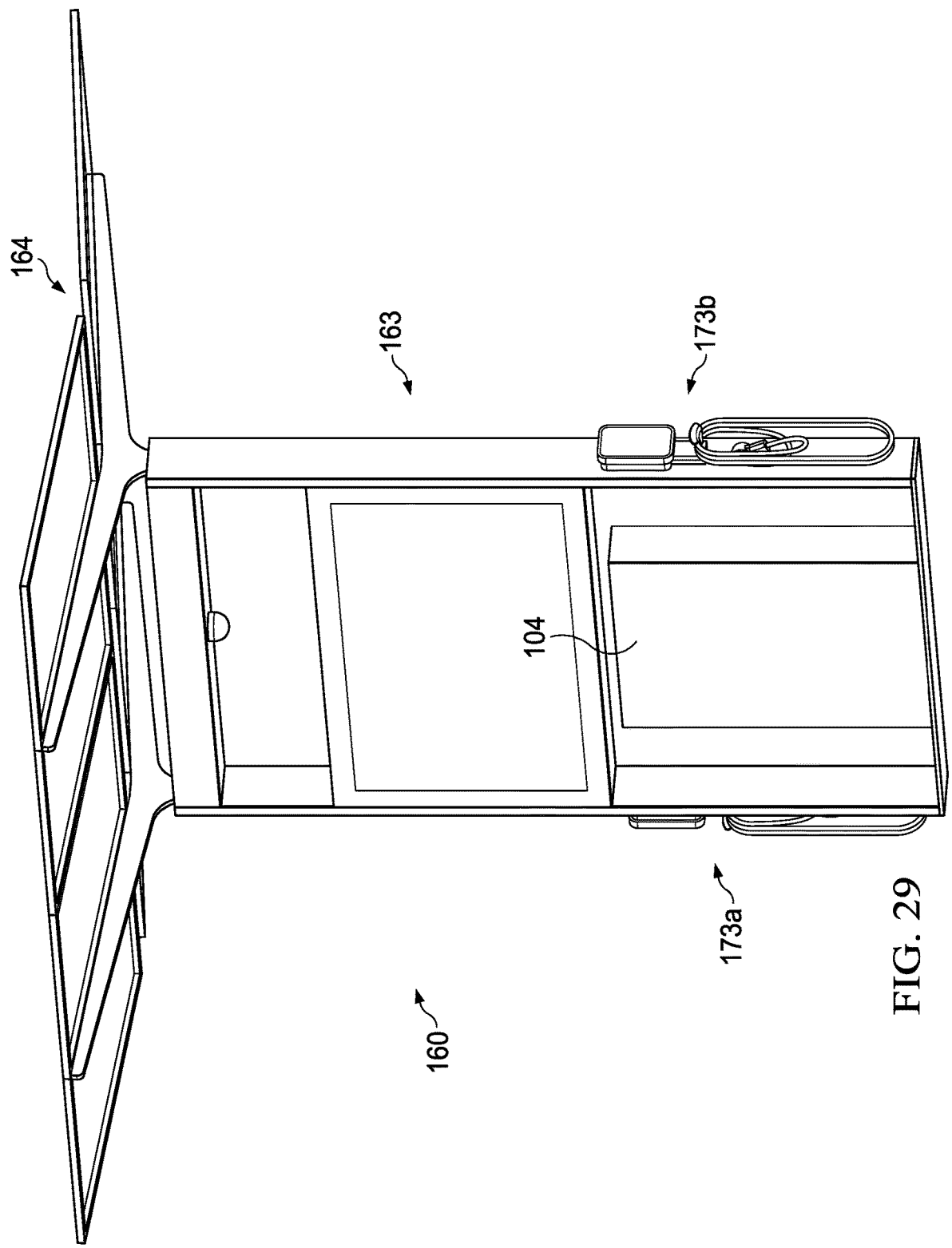
FIG. 29 is a perspective view of another exemplary surface mounted assembly with integrated charging equipment.

The bulk energy storage portion 104 may be physically attached to the electronic display portion 163, such as shown, for example, without limitation in FIGS. 25-26, or may be wholly or partially physically separate therefrom, such as shown for example without limitation in FIGS. 27-29. Such physical separation, whole or partial, may reduce heat transfer between heat generating components associated with the bulk energy storage portion 104. In exemplary embodiments, without limitation, one or more support members 166 may be provided which provide physical attachment to the surface. The electronic display portion 163 and/or the solar energy harvesting device 164 may be mounted to the one or more support member 166 at positions elevated from the surface. For example, without limitation, the support members 166 may be provided on either side of the bulk energy storage portion 104 and the electronic display portion 163 may be mounted to a mid-portion thereof above the bulk energy storage portion 104, and the solar energy harvesting devices 164 may be mounted to an upper portion thereof above the electronic display portion 163 and the bulk energy storage portion 104. Any type of kind of structural framework comprising one or more members or other supporting devices may be utilized for mounting the units 160 to one or more surfaces and/or mounting various components thereof relative to one another.

One or more chargers 173, such as but not limited to, electrical vehicle chargers, may be provided. In exemplary embodiments, the chargers 173 are mounted to one or more of the supports 166. The chargers 173 may be electrically connected to the bulk energy storage portion 104 and/or the solar energy harvesting device 164 for dispensing power generated from, and/or stored at, the same. In exemplary embodiments, at least some of the power generated by the solar energy harvesting devices 164 is stored at the bulk energy storage portion 104 and dispensed by the chargers 173 to attached items, such as electrical vehicles where such power is available and remaining power may be pulled from an associated electrical grid. Power sourcing may be performed by one or more controllers, which may be located at the bulk energy storage portion 104, the electronic display portion 163, or other portion of the display unit 160. Such controllers may be electrically interposed between the chargers 173 and at least the electrical grid and the bulk energy storage portion 104. The controllers may be also electronically interposed between the solar energy harvesting portion 164 and the bulk energy storage portion 104 and configured to route all electricity generated, or all electrically generated except which is used to power the electronic display portion 163, to the bulk energy storage portion 104 for storage and subsequent distribution to the electronic display portion 163 and/or the chargers 173.

The solar energy harvesting devices 164 may be in electrical connection with some or all components of the electronic display portion 163 or other portions of the display unit 160. Electronical operations of the display unit 160, including but not limited to, the solar energy harvesting devices 164, the electronic display portion 163, and/or the bulk energy storage portion 104 may be as shown and/or described herein.

The solar energy harvesting potion 164 may have a larger footprint than the bulk energy storage portion 104, charging equipment 173, and/or electronic display portion 163. The solar energy harvesting portion 164 may be positioned above in an elevated position above the bulk energy storage portion 104, charging equipment 173, and/or electronic display portion 163 to extend over the same in a canopy arrangement to act as a roof or shelter such that shade is periodically or continuously cast on one or more of the bulk energy storage portion 104, charging equipment 173, and/or electronic display portion 163. This may provide increased contrast at the electronic display(s), thereby improving image quality. This may, alternatively or additionally, provide cooling to the bulk energy storage portion 104, charging equipment 173, and/or electronic display portion 163 which may normally generate heat when operational, thereby decreasing cooling demands, maximizing energy storage, combinations thereof, or the like. This may also provide shade to nearby persons, increasing the desirability of dwelling in such places. One or more items of street furniture, such as but not limited to waste disposal containers 105, may be integrated with, or otherwise associated with, the bulk energy storage portion 104.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections described herein may be accomplished by wired or wireless means.

What is claimed is:

1. A display assembly with solar power features, said display assembly comprising:
    a structural framework, wherein said structural framework is configured for attachment to a surface;
    one or more electronic displays;
    a respective housing for each of said one or more electronic displays, wherein each of said one or more electronic displays are secured to said structural framework by way of the respective housing, which is secured to the structural framework at a position which elevates the one or more electronic displays above said surface when said structural framework is attached to the surface;
    one or more solar panels positioned above said structural framework and above said one or more electronic displays; and
    one or more bulk energy storage devices electrically connected with said one or more electronic displays and said one or more solar panels;
    wherein said one or more solar panels are spaced apart from an upper surface of the housings for the one or more electronic displays and collectively extend laterally beyond said structural framework to form a canopy arrangement over said one or more electronic displays.

2. The display assembly of claim 1 wherein:
    said one or more electronic displays comprise at least two electronic displays respectively located on opposing sides of said structural framework.

3. The display assembly of claim 1 further comprising:
    one or more open loop pathways for ambient air extending within the housing of said one or more electronic displays; and
    one or more closed loop airflow pathways for circulating gas extending within the housing of said one or more electronic displays.

4. The display assembly of claim 1 further comprising:
    a housing for said one or more bulk energy storage devices located below said one or more electronic displays.

5. The display assembly of claim 1 wherein:
    said structural framework is configured for mounting at a sidewalk;
    said one or more bulk energy storage devices comprise batteries; and
    said one or more solar panels each comprise a number of cells located on a respective substrate.

6. The display assembly of claim 1 wherein:
    said one or more solar panels comprise multiple solar panels, each provided at an angle between 0-180 degrees relative to each other.

7. The display assembly of claim 1 further comprising:
one or more electric vehicle chargers secured to said structural framework and electrically connected with said one or more bulk energy storage devices.

8. The display assembly of claim 7 wherein:
said one or more bulk energy storage devices are configured for electrical connection with an electrical grid.

9. The display assembly of claim 1 wherein:
said one or more solar panels are configured to produce direct current ("DC") power;
said one or more electronic displays are configured to accept power from the one or more solar panels in DC power form; and
said one or more electronic displays are configured to accept power from an electrical grid in alternating current form.

10. The display assembly of claim 1 wherein:
said one or more electronic displays are indirectly secured to said structural framework; and
said one or more solar panels are indirectly secured to said structure framework.

11. The display assembly of claim 1 wherein:
each of said one or more electronic displays comprises a directly backlit liquid crystal display.

12. A display assembly with solar power features, said display assembly comprising:
a structural framework for installation at a surface;
one or more electronic displays, each secured to said structural framework at an elevated position;
solar panels positioned above said structural framework and said one or more electronic displays, wherein each of said solar panels are provided at an angle between 0-180 degrees, inclusive, relative to the surface and each other when said display assembly is installed at said surface; and
one or more bulk energy storage devices electrically connected with said one or more electronic displays and said one or more solar panels, wherein said solar panels collectively extend laterally beyond a footprint of said structural framework to provide a canopy arrangement for said one or more electronic displays.

13. The display assembly of claim 12 wherein:
said structural framework is configured for installation at a sidewalk;
each of said one or more bulk energy storage devices comprise at least one battery;
each of said solar panels comprise a number of cells located on a substrate; and
each of said one or more electronic displays comprises a directly backlit liquid crystal display.

14. The display assembly of claim 13 further comprising:
a housing for each of the one or more electronic displays;
an open loop pathway for ambient air at each of said one or more electronic displays; and
a closed loop airflow pathway for circulating gas at each of said one or more electronic displays.

15. A display assembly with solar power features, said display assembly comprising:
a structural framework configured for installation at a surface;
one or more electronic displays secured to said structural framework at an elevated position;
one or more solar panels positioned above said structural framework and above said one or more electronic displays;
one or more bulk energy storage devices electrically connected with said one or more electronic displays and said one or more solar panels; and
one or more electric vehicle chargers provided at said structural framework and electrically connected with said one or more one bulk energy storage devices;
wherein said one or more solar panels collectively extend laterally beyond an outer perimeter of said structural framework to provide a canopy arrangement for said one or more electronic displays.

16. The display assembly of claim 15 wherein:
said structural framework is configured for mounting at a sidewalk;
each of said one or more bulk energy storage devices comprise at least one battery;
each of said one or more solar panels comprise a number of cells located on a substrate; and
each of said one or more electronic displays comprises a directly backlit liquid crystal display.

17. The display assembly of claim 16 further comprising:
a housing for each of the one or more electronic displays;
an open loop pathway for ambient air at each of said one or more electronic displays; and
a closed loop airflow pathways for circulating gas at each of said one or more electronic displays.

* * * * *